(12) United States Patent
Venkatachalam et al.

(10) Patent No.: US 11,821,850 B2
(45) Date of Patent: *Nov. 21, 2023

(54) RADIOGRAPHIC INSPECTION SYSTEM FOR PIPES AND OTHER STRUCTURES AND MATERIAL LOSS ESTIMATION

(71) Applicant: Varex Imaging Corporation, Salt Lake City, UT (US)

(72) Inventors: Rajashekar Venkatachalam, Cypress, TX (US); David T Nisius, Des Plaines, IL (US)

(73) Assignee: Varex Imaging Corporation, Salt Lake City, UT (US)

( * ) Notice: Subject to any disclaimer, the term of this patent is extended or adjusted under 35 U.S.C. 154(b) by 368 days.

This patent is subject to a terminal disclaimer.

(21) Appl. No.: 17/037,572

(22) Filed: Sep. 29, 2020

(65) Prior Publication Data

US 2022/0099599 A1    Mar. 31, 2022

(51) Int. Cl.
    *G01N 23/04*    (2018.01)
    *G01N 23/18*    (2018.01)

(52) U.S. Cl.
    CPC ............. *G01N 23/04* (2013.01); *G01N 23/18* (2013.01); *G01N 2223/3303* (2013.01); *G01N 2223/401* (2013.01); *G01N 2223/628* (2013.01); *G01N 2223/646* (2013.01)

(58) Field of Classification Search
    CPC .................... G01N 23/04; G01N 23/18; G01N 2223/3303; G01N 2223/401; G01N 2223/628; G01N 2223/646; G01N 17/00; G01N 23/06

See application file for complete search history.

(56) References Cited

U.S. PATENT DOCUMENTS

| 2,957,987 A | 10/1960 | Arnesen |
| 7,480,363 B2 | 1/2009 | Lasiuk et al. |
| 2006/0058974 A1* | 3/2006 | Lasiuk ................. G01B 15/025 702/97 |

(Continued)

FOREIGN PATENT DOCUMENTS

| EP | 3663747 | 6/2020 |
| JP | 62277542 | 12/1987 |

(Continued)

OTHER PUBLICATIONS

PCT/US2021/052713, International Search Report dated Feb. 25, 2022.

(Continued)

*Primary Examiner* — Courtney D Thomas
(74) *Attorney, Agent, or Firm* — Laurence & Phillips IP Law

(57) ABSTRACT

Some embodiments include a radiographic inspection system, comprising: a drive mechanism configured to move along a structure; a detector attached to the drive mechanism; a radiation source attached to the drive mechanism and positionable relative to the detector such that a width of the structure casts a radiation shadow on an active area of the detector; and control logic coupled to the detector and configured to: receive an image from the detector; generate side wall loss information based on the image; and generate bottom wall loss information based on the image.

20 Claims, 24 Drawing Sheets

(56) References Cited

U.S. PATENT DOCUMENTS

2022/0099598 A1* 3/2022 Nisius .................... G01N 23/04
2022/0099599 A1* 3/2022 Venkatachalam ...... G01N 23/06

FOREIGN PATENT DOCUMENTS

| JP | 2001004562 | 1/2001 |
| --- | --- | --- |
| WO | 2010033265 | 3/2010 |
| WO | 2019094754 | 5/2019 |

OTHER PUBLICATIONS

PCT/US2021/052713,Written Opinion dated Feb. 25, 2022.
Edalati et al., "The use of radiography for thickness measurement and corrosion monitoring in pipes," Int'l Journal of Pressure Vessels and Piping, Elsevier Science Publishers, vol. 83, No. 10, pp. 736-741Oct. 2006 (Oct. 2006).
Prasetyo et al., "Tangential X-Ray Radiography for Pitting Geometry Analysis of Outside Wall of Insulated Steel Pipes," Russian Journal of Nondestructive Testing, Consultants Bureau, New York, US, vol. 56, No. 3, pp. 249-258, Mar. 2020 (Mar. 2020).

* cited by examiner

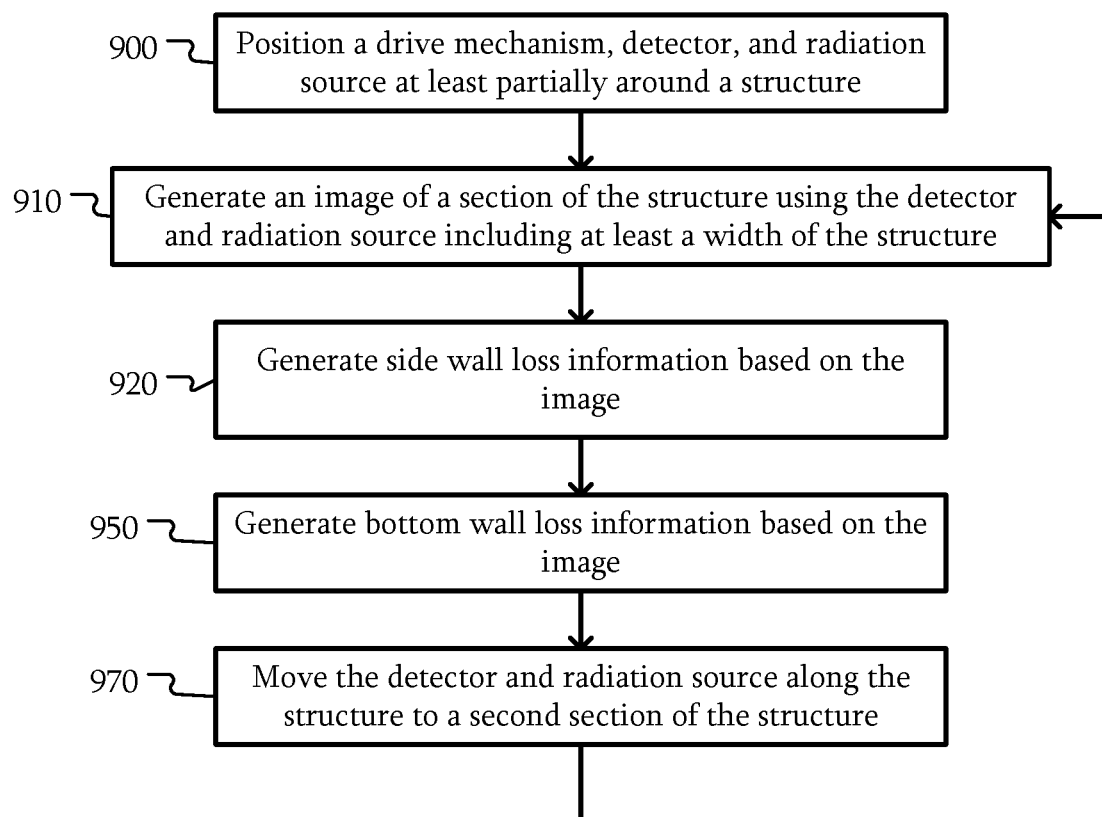

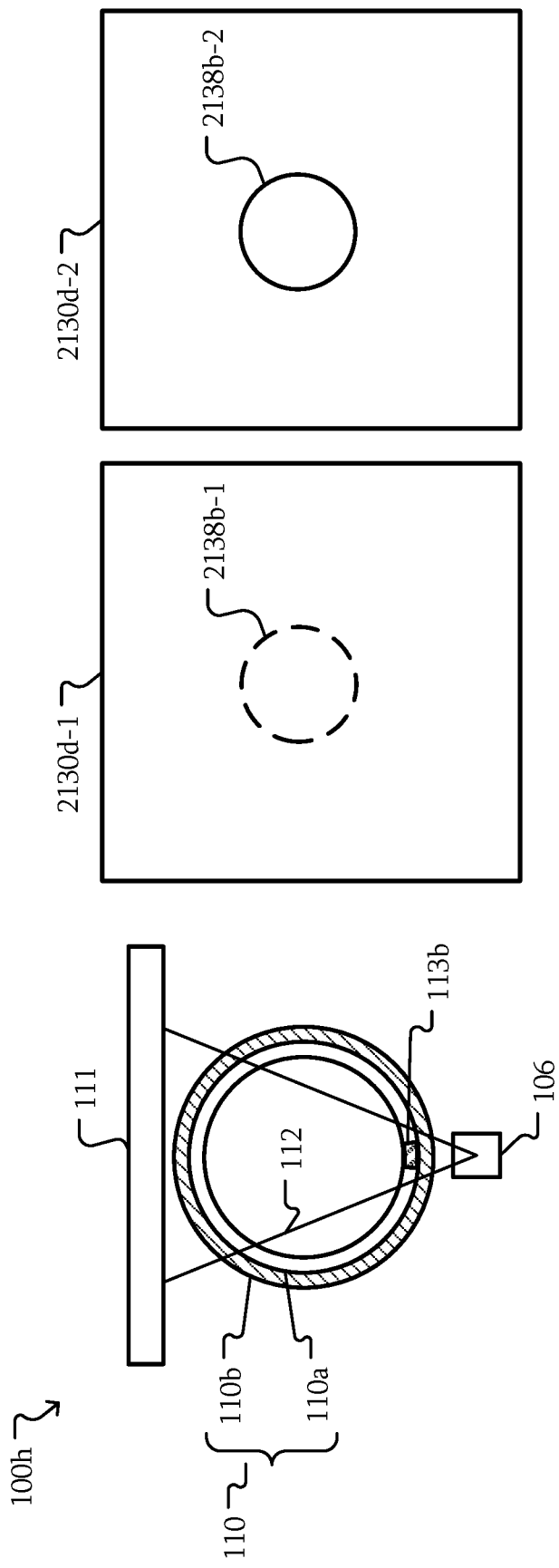

RADIOGRAPHIC INSPECTION SYSTEM FOR PIPES AND OTHER STRUCTURES AND MATERIAL LOSS ESTIMATION

Radiographic inspection systems may generate images of objects such as pipes. For example, pipes may be surrounded by insulation. Beneath the insulation, the pipe may corrode. A radiographic inspection system may be attached to a pipe to generate multiple images along the pipe. However, in a single section of pipe, multiple images may be needed to inspect a 360-degree view of the pipe. In addition, the resulting images may provide only qualitative indications of material loss

BRIEF DESCRIPTION OF SEVERAL VIEWS OF THE DRAWINGS

FIGS. 9A-9B are flowcharts illustrating techniques of using radiographic inspection systems according to some embodiments.

FIGS. 21A-21D are block diagrams illustrating a radiographic inspection system, an insulated pipe with various defects, and corresponding images according to some embodiments.

DETAILED DESCRIPTION

Some embodiments relate to radiographic inspection systems and, in particular, to radiographic inspection system for pipes and other structures and material loss estimation (MLE).

Pipelines may have insulation as protection against environmental conditions, such moisture. For example, if moisture reaches the pipe, it may cause corrosion. Such pipelines may extend for several miles or more. Corrosion under insulation (CUI) is the corrosion of piping and vessels that may occur beneath insulation as a result of water penetration, condensation, or other conditions. Determining the corrosion and, in particular, the quantity of the corrosion may be difficult to determine. Some inspection tools require removal of the insulation as part of the inspection process.

CUI may be inspected using radiographic testing (RT). Radiography may be a suitable non-destructive testing (NDT) modality for determining CUI. Such testing may include a manual setup of a radiation source and a recording medium such as a film to image a region in a pipeline. As a result, this inspection technique may only be used for spot measurements. Radiographic film is used as the recording medium because of its small footprint or relative dimensions. However, the film must be then processed to determine the condition of the inspected region.

Figure 1A:
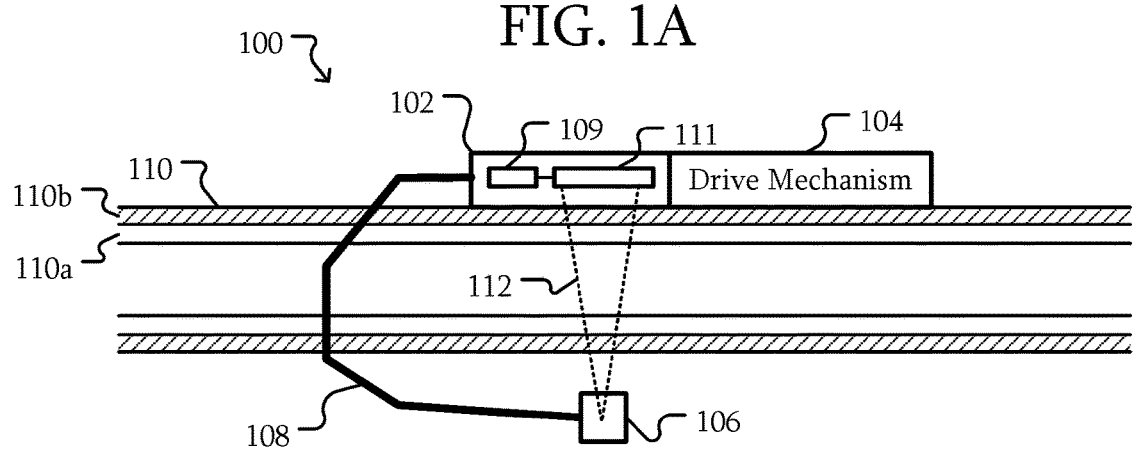
FIG. 1A is a block diagram of a radiographic inspection system and an insulated pipe according to some embodiments.
Figure 1B:
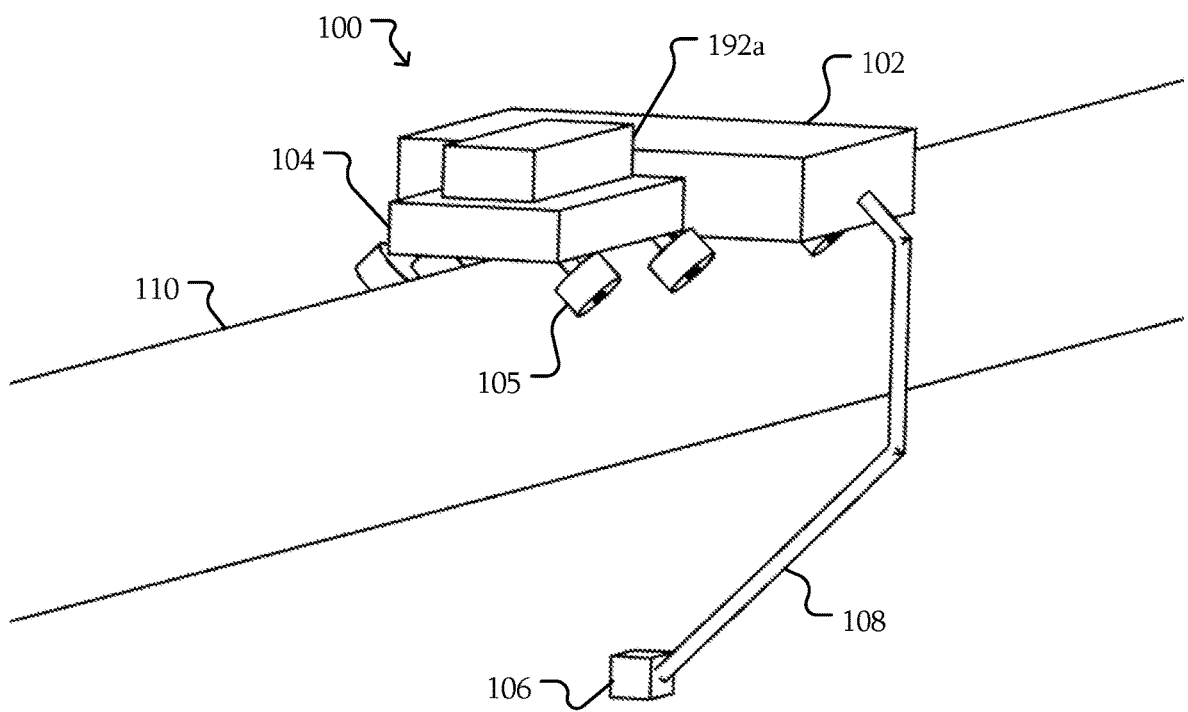
FIG. 1B is an orthographic view of a radiographic inspection system and an insulated pipe according to some embodiments.

FIG. 1A is a block diagram of a radiographic inspection system and an insulated pipe according to some embodiments. FIG. 1B is an orthographic view of a radiographic inspection system and an insulated pipe according to some embodiments. Referring to FIGS. 1A and 1B, in some embodiments, the radiographic inspection system 100 includes a detector 102, a drive mechanism 104, a radiation source 106, and a radiation source support arm (RSSA) 108. The system 100 is illustrated as being mounted on an insulated pipe 110 including a pipe 110a and insulation 110b. The insulated pipe 110 may have a variety of sizes. Examples of such pipe include about 1.5 inch (in.) to about 12 inch (about 3.81 to 30.5 centimeters (cm)) or larger diameter pipe. Insulation may have a variety of thicknesses from about 1 in. to about 4 in. (about 2.43 to about 10.16 cm.) or more. In some embodiments, the system 100 may be configured for a single insulated pipe 110 diameter. In other embodiments, the system 100 may be adjustable so that the system 100 may be used with insulated pipes 110 of a range of diameters, wall thicknesses, and insulation thicknesses. While an insulated pipe 110 is used as an example of a structure on which the radiographic inspection system 100 may be installed, the radiographic inspection system 100 may be used on other structures such as a conduit, cable, or the like.

The detector 102 is a system configured to generate an image based on incoming radiation 112. The detector 102 includes a two-dimensional imaging array 111 of sensors configured to sense the radiation 112 from a radiation source 106. The detector 102 may include an amorphous silicon (a-Si), indium gallium zinc oxide (IGZO), or complementary metal-oxide-semiconductor (CMOS) flat panel detector, or the like. In other embodiments, the detector 102 may include a curved detector. In other embodiments, the detector 102 may include a flexible detector 102 that may be conformable to the curvature of the insulated pipe 110. In some embodiments, the curvature of the flexible detector 102 may be different than that of the insulated pipe 110 to accommodate the detector 102 being radially offset from the insulated pipe 110. In other embodiments, the detector 102 may include a line scanner with a small number of pixels along the width relative to number of pixels along the length. Line scanners may be used in continuous scanning applications or applications of continuous uniform movement of the detector 102 when generating images described herein.

A conversion screen, scintillator, or the like may be included in the detector 102 (using indirect conversion sensors) to convert the radiation 112 into wavelengths detectable by the imaging array 111 of the detector 102. For example, a scintillator may include gadolinium oxysulfide ($Gd_2O_2S$; GOS; Gadox), gadolinium oxysulfide doped with terbium ($Gd_2O_2S$:Tb), cesium iodide (CsI), or the like. Although some materials of the scintillator have been used as examples, in other embodiments, the material may be different depending on the particular radiation source 106. In other embodiments, the imaging array 111 may include direct conversion sensors, including cadmium telluride (CdTe), cadmium zinc telluride (CdZnTe or CZT), selenium, or the like, configured to directly convert the radiation 112 into a signal.

The imaging array 111 may have a variety of sizes. In some embodiments, a pixel area of the imaging array 111 of the detector 102 may be about 14.6×14.6 cm (or 5.8×5.8 in), 20.3×25.4 cm (or 8×10 in), 35.6×43.2 cm (or 14×17 in), or the like. The imaging array 111 may have a size different than these examples to accommodate different pipe diameters. The imaging array 111 may include a 1152×1152 array of pixels. The pixel pitch may be about 127 microns (μm). The detector 102 may be configured to digitize outputs of the pixels with at least 16-bit precision. The detector 102 may include communication interfaces such as a universal serial bus (USB) interface, Ethernet interface, or the like. Although particular components and parameters of the detector 102, imaging array 111, or the like have been used as examples, in other embodiments, the parameters may be different.

The detector 102 may include control logic 109. The control logic 109 may include a general purpose processor, a digital signal processor (DSP), an application specific integrated circuit, a microcontroller, a programmable logic device, discrete circuits, a combination of such devices, or the like. The control logic 109 may include external interfaces, such as address and data bus interfaces, interrupt interfaces, or the like. The control logic 109 may include other interface devices, such as logic chipsets, hubs, memory controllers, communication interfaces, or the like to connect the control logic 109 to internal and external components. The control logic 109 may be configured to control the variety of operations described herein.

The drive mechanism 104 is an apparatus configured to move axially along the insulated pipe 110. The drive mechanism 104 is coupled to the detector 102 such that the drive mechanism 104 may move the detector 102 along the insulated pipe 110. In some embodiments, the drive mechanism 104 may be coupled to the control logic 109 of the detector 102 or other control logic and configured to automatically or manually be controlled to move the drive mechanism 104 and the detector 102 along the insulated pipe 110.

In some embodiments, the drive mechanism 104 may include wheels, tracks, guides, sensors, inertial measurement units (IMUs), positioning systems, or the like. These components may allow the drive mechanism 104 to position itself on the insulated pipe 110, hold a position while acquiring an image using the detector 102, move the system 100 along the insulated pipe 110 so that a different section of the insulated pipe 110 may be imaged and inspected, and/or maintain a relative rotational orientation of the system 100 relative to the insulated pipe 110 such that it may move in a straight direction and maintain the system 100 on the insulated pipe 110.

The radiation source 106 is configured to generate radiation 112. The radiation source 106 is attached to the drive mechanism 104 and positionable relative to the detector 102 such that a width of the insulated pipe 110 and/or the pipe 110a casts a radiation "shadow" on an active area or imaging array 111 of the detector 102.

The radiation source 106 may include a variety of devices configured to generate radiation 112. For example, the radiation source 106 may include a radioisotope such as Ir-192, an x-ray source (e.g., x-ray tube), a gamma radiation source, or the like. In a particular example, the radiation source 106 may include a radioisotope and a radiographic collimator configured to shape the radiation 112.

The entire radiation source 106 may be self-contained within the radiographic inspection system 100. For example, an exposure device, exposure tube, a radiographic collimator, or the like may be coupled to and configured to move with the drive mechanism 104. The radiation source 106 may include a structure that allows for the radioisotope to be extended and retracted towards the radiographic collimator. For example, the radiation source 106 may be coupled to a cable 120. The cable 120 may be manipulated, such as by activating a motor, actuator, or the like, to move the radioisotope to the collimator. A radioisotope may be extended into the collimator to generate the radiation 112 to capture an image. When the radiographic inspection system 100 will be moved to image a different section of the insulated pipe 110, the radioisotope may be retracted.

Figure 8A:
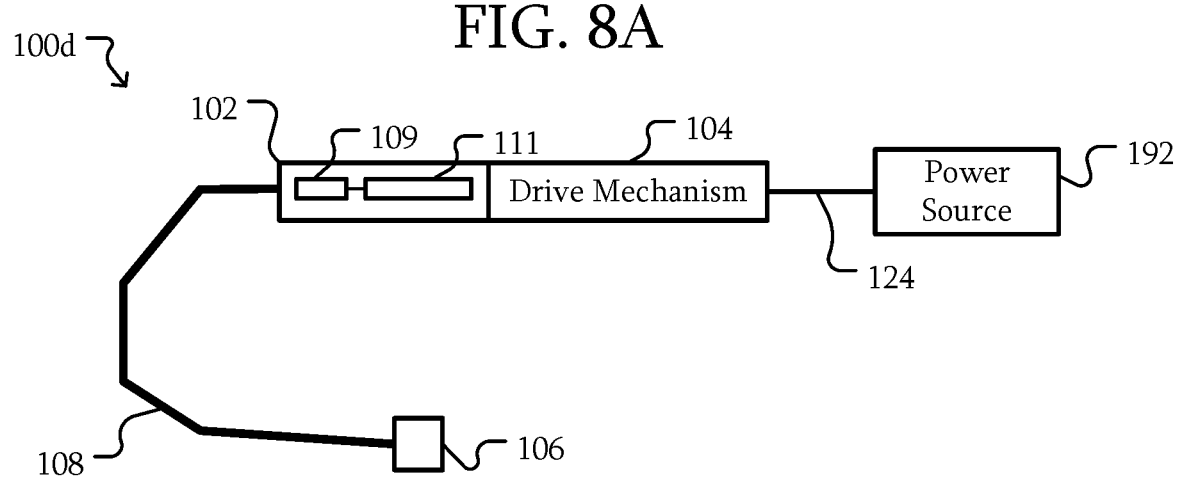
FIGS. 8A-8D are block diagrams of radiographic inspection systems according to some embodiments.
Figure 8B:
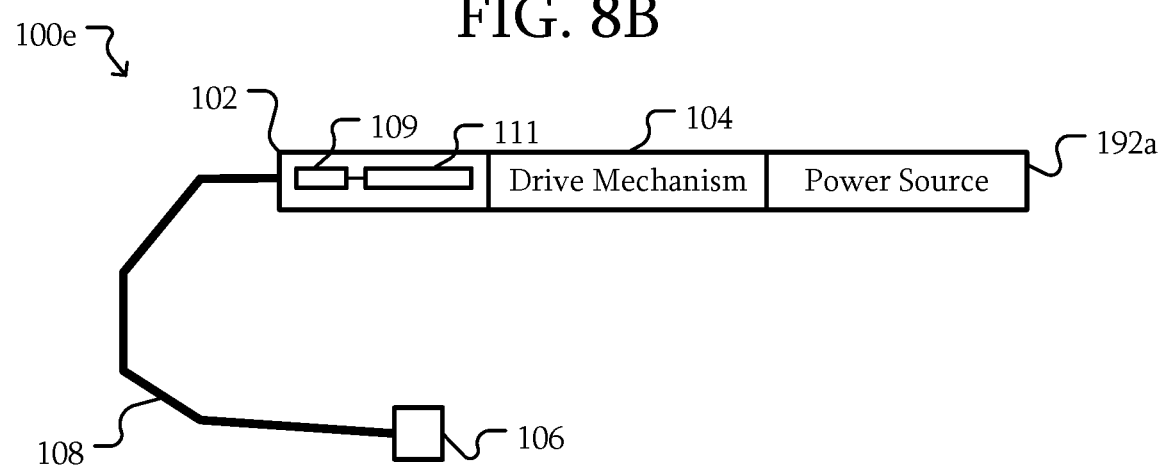

When radiation source 106 is an electrically power device, the entire radiation source 106 may be self-contained and powered within the radiographic inspection system 100, 100e (FIG. 8B). The power source 192a may be a battery, solar cell, fuel cell, generator, or other mechanism to deliver portable electrical power.

The radiation source 106 may be rigidly and/or adjustably coupled to the detector 102 by the radiation source support arm 108. The radiation source support arm 108 may provide zero or more degrees of freedom to position the radiation source 106 relative to the detector 102. For example, the radiation source support arm 108 may include a c-shaped arm that rigidly connects the radiation source 106 to the detector 102. Such a system 100 may be designed for a single diameter of pipe. In other examples, the radiation source support arm 108 may include multiple degrees of freedom to rotate and/or translate the radiation source 106 relative to the detector 102. The radiation source support arm 108 may be configurable to be fixed to rigidly (or semi-permanently) connect the radiation source 106 to the detector 102 after adjustment. For example, the radiation source support arm 108 may be indexed for rapid semi-fixed adjustment for different pipe diameters and pipe configurations. Thus, the orientation of the radiation source 106 and the detector 102 may be fixed during that operation. However, for another operation, such as when the system 100 is moved to a different diameter pipe, the radiation source support arm 108 may be adjusted to accommodate the difference in the pipe diameter. In some embodiments, the radiation source support arm 108 may include a series of joints to adjust the position and orientation of the radiation source 106. Regardless, the radiation source support arm 108 may be configurable to be fixed after adjustment such that when the detector 102 moves around the pipe 110, the relative position between the detector 102 and the radiation source 106 remains substantially the same. Substantially the same may include the same position but also includes some variation due to mechanical tolerances, distortion of the radiation source support arm 108, or the like.

In some embodiments, the radiation source support arm 108 may include joints or actuators that are controllable by the control logic 109. For example, the radiation source support arm 108 may include rotatable and/or translatable joints controlled by actuators and the control logic 109 such that the radiation source 106 may be placed in a variety of locations relative to the detector 102 and/or insulated pipe 110.

In the example of FIG. 1B, the drive mechanism 104' includes multiple wheels 105. The wheels 105 may be controllable by the control logic 109 and/or other control logic of the drive mechanism 104 to move the system 100 along the insulated pipe 110, maintain the orientation of the system 100 on the insulated pipe 110, rotate the system 100 around the insulated pipe 110, or the like. A power source 192a, which will be described in further detail below, is mounted to the drive mechanism 104. Although a position, orientation, configuration, or the like of the system 100 has been used as an example in FIG. 1B, in other embodiments, the configuration may be different.

Figure 2:
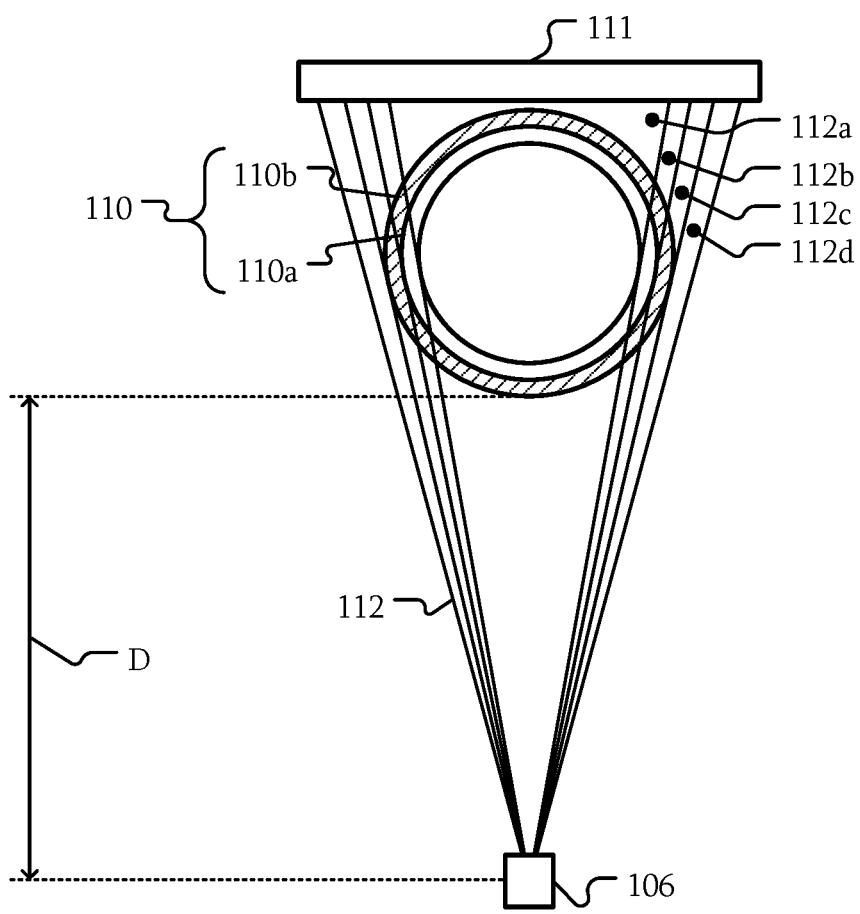
FIG. 2 is a block diagram of a configuration of a radiographic source of a radiographic inspection system relative to an insulated pipe according to some embodiments.
Figure 3:
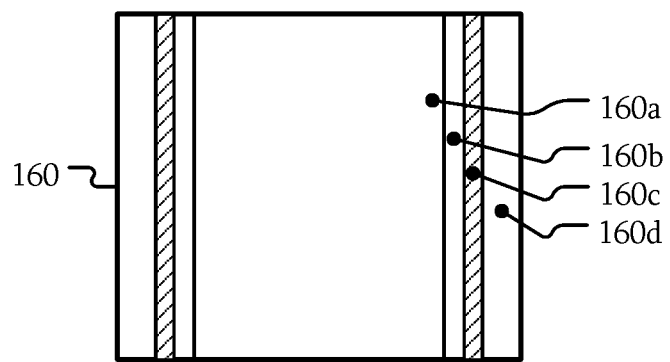
FIG. 3 is a block diagram of an image of an insulated pipe from a radiographic inspection system according to some embodiments.

FIG. 2 is a block diagram of a configuration of a radiographic source of a radiographic inspection system relative to an insulated pipe according to some embodiments. FIG. 3 is a block diagram of an image of an insulated pipe from a radiographic inspection system according to some embodiments. Referring to FIGS. 1-3, the radiation source 106 is positioned relative to the array 111 and the insulated pipe 110 such that the radiation 112 extends across the width of the insulated pipe 110. For example, the radiation source 106 may be placed at a distance D away from the pipe that is two times the diameter of the insulated pipe 110 or greater. In some embodiments, the distance D may be four to five times the diameter of the insulated pipe 110 or greater. In another example, the angle of the radiation 112 may be selected such that the beam extends beyond the perimeter of the insulated pipe 110.

As a result, the entire width of the structure may be imaged. The array 111 of the detector 102 is illustrated with various regions 112a-112d of the radiation 112 incident on the array 111. Region 112a corresponds to the radiation 112 that has passed through both walls of the pipe 110a. Region 112b corresponds to the radiation 112 that has passed tangentially through the wall of the pipe 110a. Region 112c corresponds to the radiation 112 that has passed tangentially through the insulation 110b. Finally, region 112d corresponds to the radiation 112 that has not passed through any portion of the insulated pipe 110. Each of these regions 112a-112d has a corresponding region 160a-160d in the image 160.

In some embodiments, the image 160 may be used for a combination of tangential profile and double wall-double image (DWDI) radiography and/or a double wall-single image (DWSI) radiography. Regions 160b in the image 160 correspond to the tangential profile of the wall of the pipe 110a and may be used to determine wall thickness, for example, by comparison to a calibrated sample such as a steel ball. Region 160a corresponds to the top and bottom walls. As used herein, the bottom wall is the wall of the pipe closest to the array 111 while the top wall is the wall of the insulated pipe 110 furthest from the array 111. In some embodiments, wall loss information may be generated for both the top wall and the bottom wall. As a result, a complete 360-degree scan of the wall loss information may be performed using a single image 160 of the insulated pipe 110. That is, wall loss information may be generated for the top wall, bottom wall, and both side walls from the single image 160. The estimate of the loss for the top and bottom walls may be combined. However, the estimate may still be used to determine if the wall loss at that position along the insulated pipe 110 that needs further inspection.

Figure 4A:
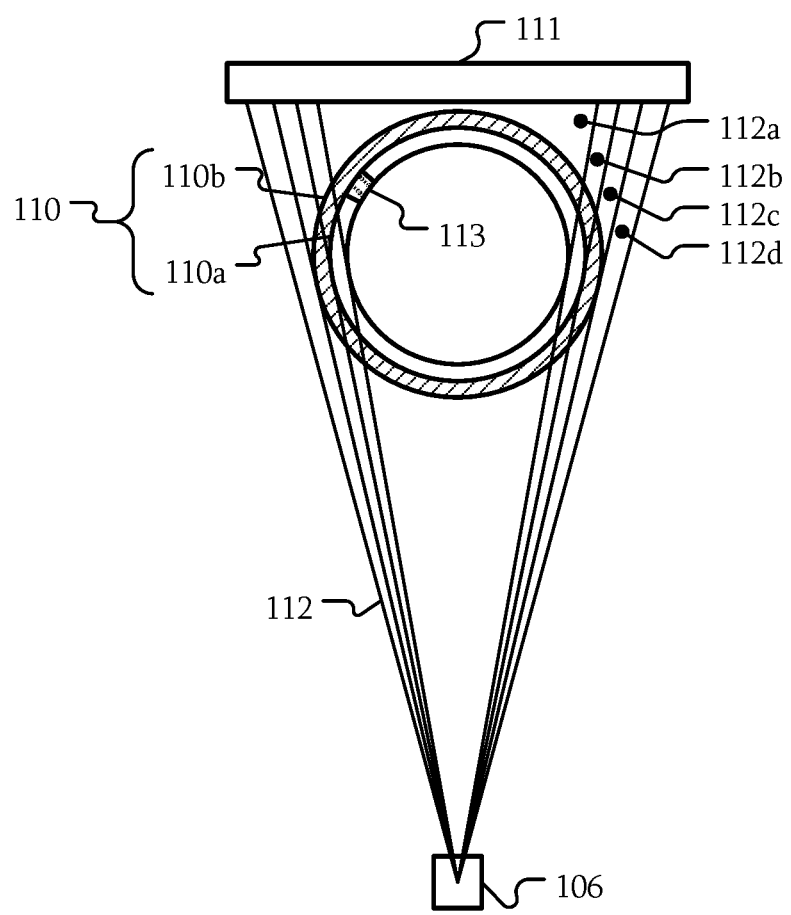
FIGS. 4A-4B are block diagrams illustrating a rotation of a radiographic inspection system around an insulated pipe according to some embodiments.
Figure 4B:
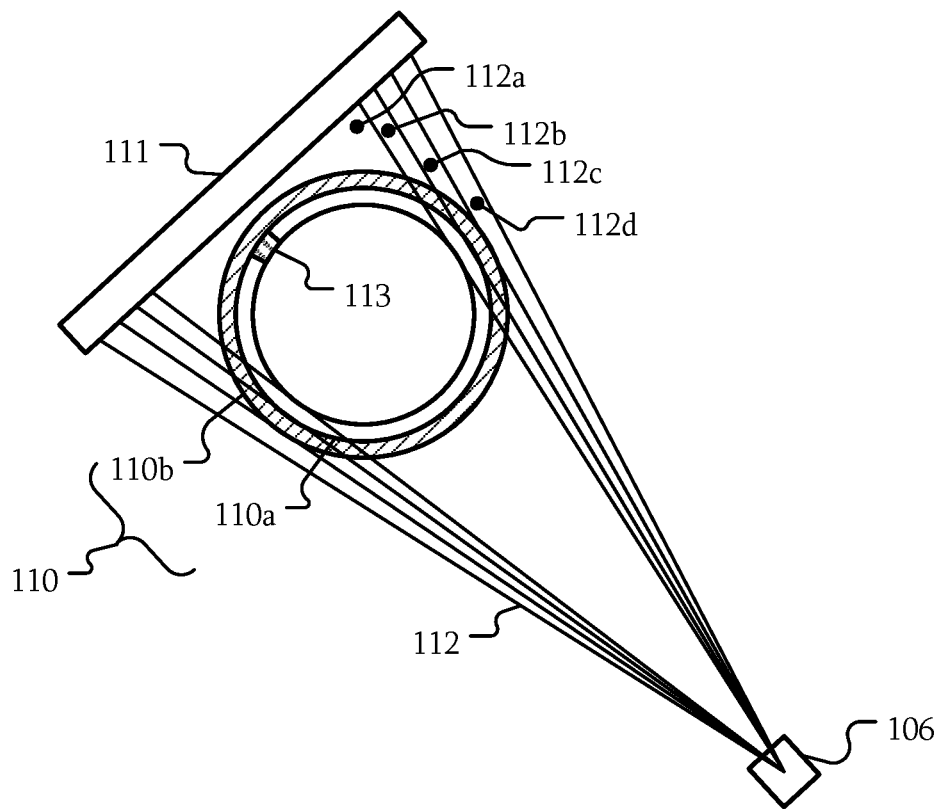

FIGS. 4A-4B are block diagrams illustrating a rotation of a radiographic inspection system around an insulated pipe according to some embodiments. Referring to FIGS. 1, 3, 4A, and 4B, in some embodiments, the radiation source 106 and the detector 102 and hence, the array 111 is configured to rotate at least partially or fully around the insulated pipe 110. For example, the drive mechanism 104 may include a chain belt, roller chain, a flexible structure, or the like at least partially or fully wrapped around the insulated pipe 110. In a particular example, the chain belt may rotatably couple the detector 102 to the insulated pipe 110 while a motor, wheels, or other structures rotates the position of the detector 102 around the insulated pipe 110.

In particular, a region 113 of the insulated pipe 110 may be closer to an edge of the region 160a in the image 160. By rotating the detector 102 as illustrated in FIG. 4B, the region 113 be closer to a center of the region 112a of the radiation 112 and thus may appear in the image 160 closer to the center of the region 160a. An accuracy of the wall loss estimation may be greater closer to the center of the region 160a. Thus, an accuracy of the wall loss in the region 113 may be improved.

Figure 5:
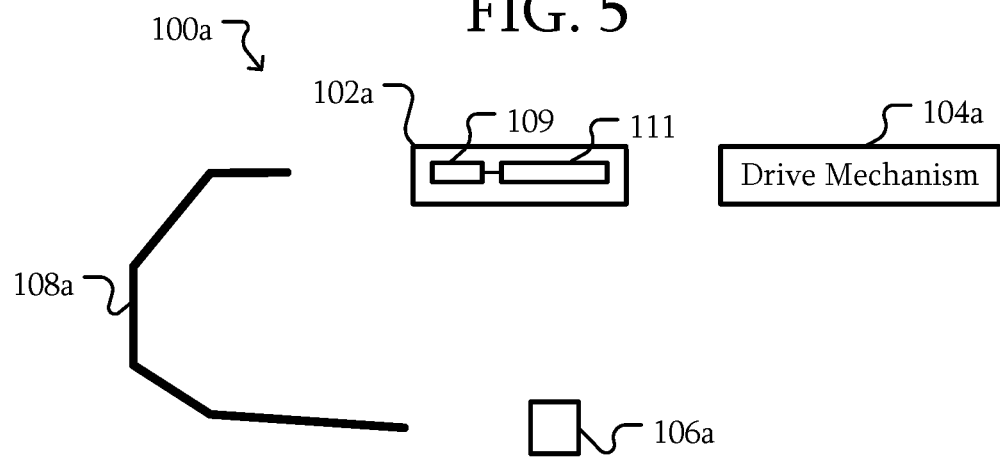
FIG. 5 is a block diagram of a modular radiographic inspection system according to some embodiments.

FIG. 5 is a block diagram of a modular radiographic inspection system according to some embodiments. The system 100a may be similar to the system 100 described above. However, the system 100a may be formed of modular components. Here, the drive mechanism 104a, detector 102a, radiation source 106a, and radiation source support arm 108a may each include detachable attachment structures configured to be removably coupled to other components. For example, the components may include screws, bolts, quick-release structures, or the like such that a variety of different components may be connected together for a specific application. The detectors 102a may have a variety of sizes, the drive mechanism 104a may have a variety of structures for attachment to a variety of different pipe 110 sizes. The radiation source support arm 108a may include fixed arms for a different diameters of pipe or configurable arms for a range of insulated pipe 110 diameters. The radiation source 106a may have a variety of different radiation 112 angles.

In a particular example, a diameter of an insulated pipe 110, a clearance between the insulated pipe 110 and other structures, or the like may result in the selection of a size of a detector 102a and a size and/or shape of a radiation source support arm 108a. In another example, a wall thickness and/or a material within the insulated pipe 110 may result in the selection of a type and/or strength of a radiation source 106a.

In a particular example, a user may arrive at a worksite. An insulated pipe 110 with a particular diameter may be present at the worksite. The user may select the detector 102a, drive mechanism 104a, radiation source support arm 108a and radiation source 106a based on the particular conditions at the worksite including the insulated pipe 110, support structures, obstacle clearances, or the like. After assembling the modular system 100a, the user may scan the insulated pipe 110. When moving to a new worksite with a potentially different type of insulated pipe or other conditions, the system 100a may be configured by a user with different components particular to the insulated pipe 110 and/or the conditions at that worksite.

Figure 6:
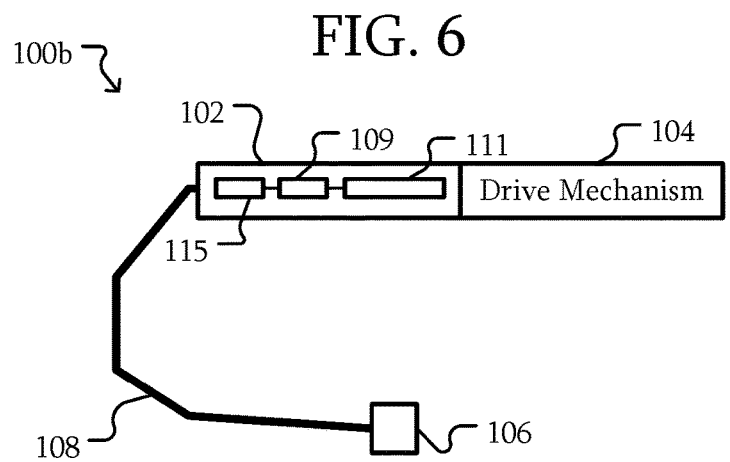
FIG. 6 is a block diagram of a radiographic inspection system with a positioning system according to some embodiments.

FIG. 6 is a block diagram of a radiographic inspection system with a positioning system according to some embodiments. The system 100b may be similar to the systems 100 and 100a described above. However, in some embodiments, the system 100b includes a positioning system 115. While the position system 115 is illustrated as part of the detector 102, the positioning system 115 may be part of the drive mechanism 104 or another component of the system 100b.

The positioning system 115 may include a variety of systems configured to determine a position of the system 100b. For example, the position system 115 may include a global positioning system (GPS), an inertial position system, a cellular communication system, or other system that may provide absolute and/or relative position information.

In some embodiments, the position information from the positioning system 115 may be associated with one or more images 160 generated using the detector 102. For example, the position information from the positioning system 115 may be embedded in metadata of the image(s) 160.

Figure 7A:
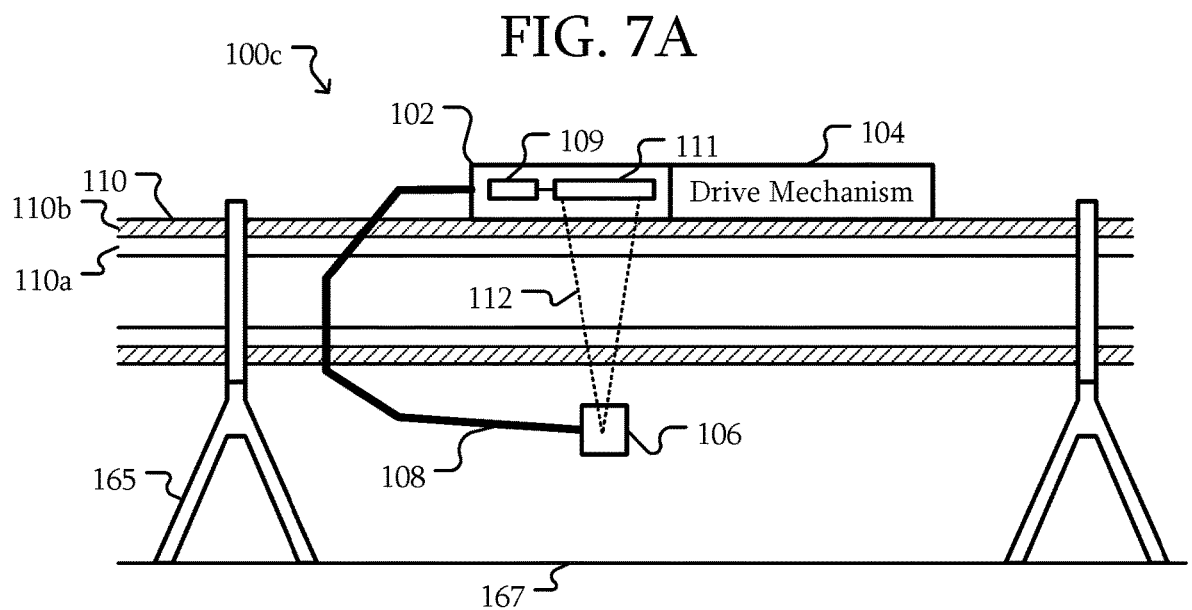
FIGS. 7A-7B are block diagrams of a radiographic inspection system relative to pipe supports according to some embodiments.
Figure 7B:
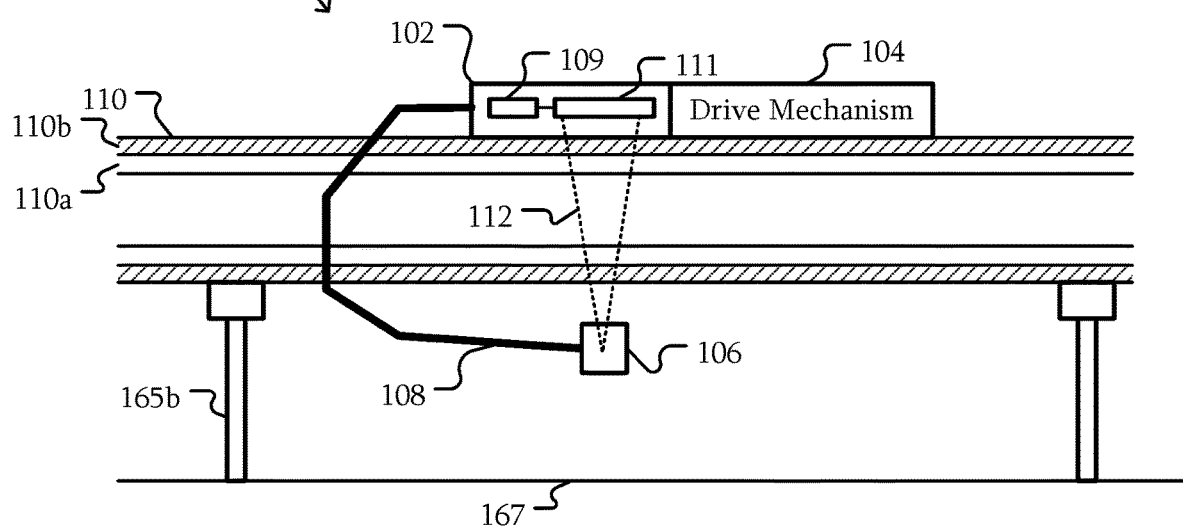

FIGS. 7A-7B are block diagrams of a radiographic inspection system relative to pipe supports according to some embodiments. Referring to FIG. 7A, the system 100c may be similar to the systems 100, 100a, 100b, or the like described herein. In some embodiments, the system 100c may be installed on an insulated pipe 110 that is supported by pipe supports 165. The pipe supports 165 may be placed periodically along the insulated pipe 110 to support the insulated pipe 110 above the ground 167.

The system 100c may be configurable such that the drive mechanism 104 moves along a side of the insulated pipe 110 opposite to the pipe supports 165. In some embodiments, the detector 102, drive mechanism 104, or the like may be larger than the radiation source 106. By placing the radiation source 106 on the side of the pipe with the pipe supports 165, the system 100c may be maneuvered to be closer to the pipe supports 165. As a result, more to all of the pipe 110a, including the regions around the pipe supports 165 may be imaged and inspected.

In some embodiments, when the system is modular as described above, less work may be performed to move the system 100c past the pipe supports 165. For example, only the radiation source support arm 108 and the radiation source 106 may be detached from the system 100c while the system 100c is moved past the pipe support 165. The radiation source support arm 108 and the radiation source 106 may be reattached once the system 100c is clear of the pipe support 165.

In some embodiments, the drive mechanism 104 may be configured to maintain the relative orientation of the system 100c on the insulated pipe 110a. In some embodiments, the weight distribution of the system 100c may be greater on the side of the insulated pipe 110 furthest from the ground 167. The drive mechanism 104 may be configured to actively maintain the orientation of the system 100c as it moves along the insulated pipe 110 and acquires images for inspection.

In some embodiments, the radiation source 106, the detector 102, and/or drive mechanism 104 is configured to rotate or move at least partially around the insulated pipe 110, as described in relation to FIGS. 4A-4B, to avoid fixed structures on the pipeline, such as the pipe support 165.

Although in a variety of embodiments, the detector 102, drive mechanism 104, or the like may be positioned on a particular side of the pipe 110, in other embodiments, the detector 102, drive mechanism 104, or other components of the system 100c may be placed on different sides of the insulated pipe 110. For example, FIGS. 1, 7 shows the drive mechanism 104 on the top of the insulated pipe 110. In other examples (not shown), the drive mechanism 104 may be on the side or bottom the insulated pipe 110. The orientation of the drive mechanism 104 to the insulated pipe 110 may be designed or configured based on the configuration of the pipeline and location of obstructions (e.g., pipe support 165) on the pipeline as to avoid the obstructions or minimize delays due to the obstructions. In some embodiments, when used in the field, different modular components may be selected as described above with respect to FIG. 5 based on the location and/or configuration of obstructions such as the pipe support 165.

Referring to FIG. 7B, in some embodiments, the system 100c may be placed at least in part around insulated pipe 110 with different supports 165b. Here, the pipe support 165b may be disposed only on one side of the insulated pipe 110. The majority of the system 100c, such as the detector 102 and drive mechanism 104, may be disposed on the opposite side of the insulated pipe 110. In some embodiments, only the radiation source 106 may be moved and/or detached and reattached to clear the pipe support 165b.

FIGS. 8A-8D are block diagrams of radiographic inspection systems according to some embodiments. Referring to FIG. 8A, in some embodiments, the system 100d may be similar to the systems 100-100c described above. The system 100d may include a power source 192. In some embodiments, the detector 102 is configured to receive power and/or communication through one or more cables 124.

The power source 192 may include a variety of different power sources. For example, the power source 192 may include a battery, a connection to a main or alternating current (AC) power source, or the like. The power source 192 may be separate from the system 100d. The cable 124 may be configured to maintain the connection between the power source 192 and the system 100d as the system 100d moves along a structure.

Referring to FIG. 8B, in some embodiments, the system 100e may be similar to the systems 100-100c described above. The power source 192a may be attached to the drive mechanism 104. The power source 192a may be configured to move along with the drive mechanism 104. For example, the power source 192a may include portable power sources such as a battery, an energy storage device, or the like. While the power source 192a is illustrated as being disposed in a particular position relative to the drive mechanism 104 and/or the detector 102, the power source 192a may be disposed in different locations.

Figure 8C:
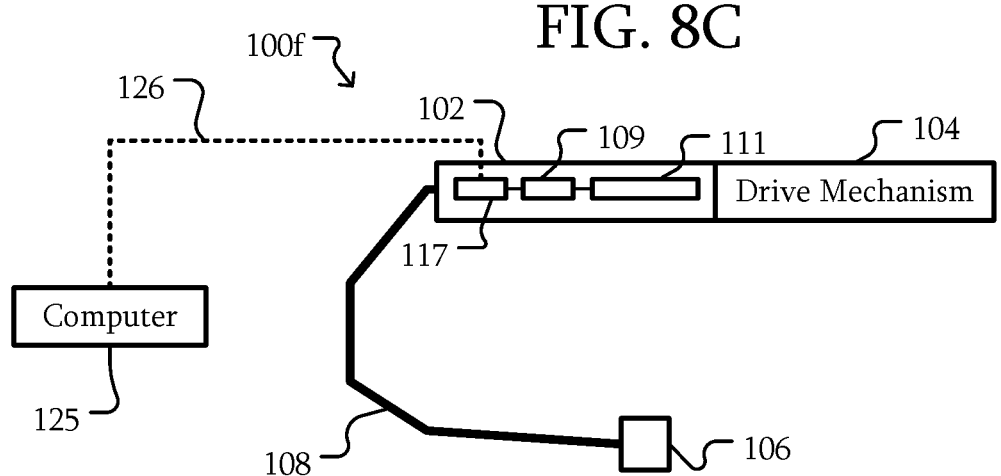

Referring to FIG. 8C, in some embodiments, the system 100e may be similar to the systems 100-100e described above. The detector 102 may be configured to communicate wirelessly. For example, the detector 102 may include a wireless communication system 117 for operation with Wi-Fi, Bluetooth, cellular data networks, satellite communication networks, or the like. In some embodiments, the control logic 109 may be configured to communicate the images, processed images, results of analysis of the images, system 100e parameters (such as location, position, orientation, and/or configuration), or the like through the wireless communication system 117.

The wireless communication system 117 may be used to create a communication link 126 between the control logic 109 and a remote computer 125. The remote computer may include a laptop, tablet computer, desktop computer, workstation, or the like. Accordingly, data generated by the system 100f may be transmitted as desired to a variety of destinations and/or the control of the system 100f may be performed remotely.

Figure 8D:
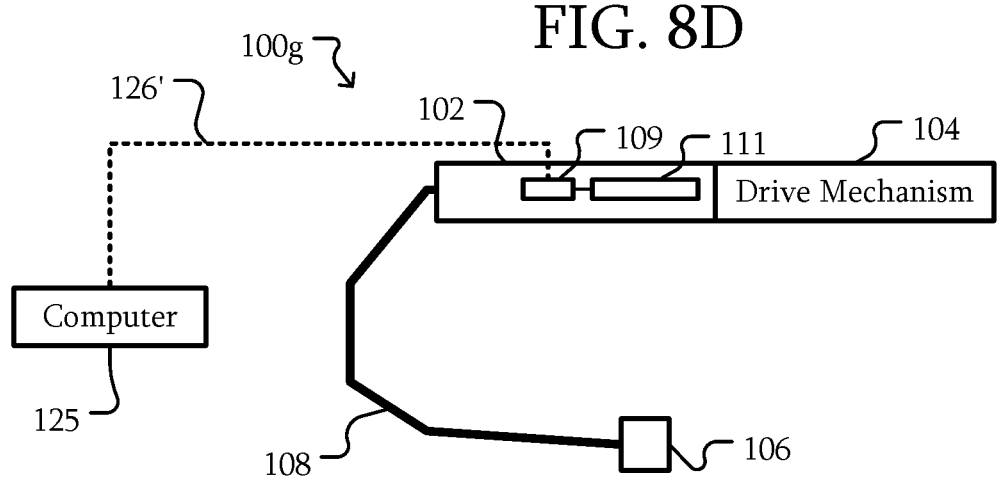

Referring to FIG. 8D, in some embodiments, the system 100g may be similar to the system 100f described above. However, the system 100g may be coupled to the remote computer 125 through a wired communication link 126'. In some embodiments, the wired communication link 126' may be formed through the cable 124 described above.

Regardless of the communication medium, in some embodiments, the communication links 126 or 126' may allow a user at the remote computer 125 to operate the system 100f, 100g, or the like.

Figure 9A:
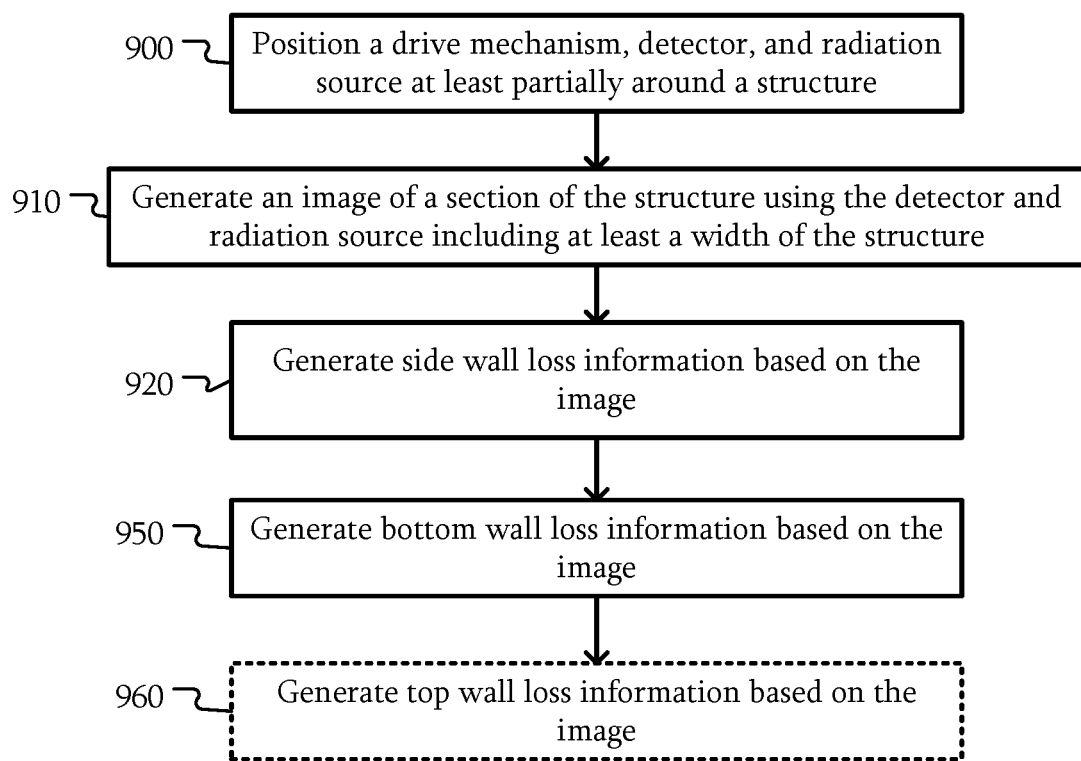

FIGS. 9A-9B are flowcharts illustrating techniques of using radiographic inspection systems according to some embodiments. The system 100 of FIG. 1 will be used as an example, however, the operations may apply to other systems 100a-100g or the like. Referring to FIGS. 1 and 9A, in 900, the drive mechanism 104, detector 102, and radiation source 106 may be positioned at least partially around a structure such as the insulated pipe 110. However, in other embodiments, the structure may be a different type of structure, such as a conduit, cable, or the like. In some embodiments, positioning the drive mechanism 104, detector 102, and radiation source 106 at least partially around the pipe 110 may include placing the drive mechanism 104 and detector 102 on the pipe 110 and positioning the radiation source 106 offset from the pipe 110 on an opposite side of the pipe 110 from the detector 102 as described above. Positioning the drive mechanism, detector, and radiation source may include assembling the system 100 at least partially around a pipe 110. In some embodiments, the system 100 may be assembled before being placed at least partially around the pipe 110 while in other embodiments, the system 100 may be assembled on the pipe 110 as part of placing the components at least partially around the pipe 110.

In 910, an image of a section of the structure may be generated using the detector 102 and radiation source 106 including at least a width of the structure. For example, the width of the insulated pipe 110 may be illuminated with the radiation source 106. The radiation 112 may be detected by the array 111 of the detector 102 to generate an image 160. For the insulated pipe 110 structure, the at least the width of the structure includes at least the pipe walls 110a and may or may not include the insulation 110b on the outer tangential or lateral edges (i.e., 112c in FIGS. 2, 4A-4B).

Wall loss information may be generated from the image. Wall loss information may be in a variety of forms. For example, wall loss information may represent thicknesses of the wall in various positions. In another example, wall loss information may represent a deviation from a nominal wall thickness. The wall loss may be represented in different ways.

In 920, side wall loss information may be generated based on the image. For example, the regions 160b may be compared to a calibrated object with a known size. In some embodiments, the calibrated object may be placed in the path of the radiation 112 such that the sample results in a corresponding portion of the image 160. That portion may be compared with tangential portion in regions 160b to determine a wall loss on the side walls. For example, a width in pixels of the side wall may be compared with the width in pixels of the calibrated object with a known width. In other embodiments, the wall loss may be estimated by converting the wall thickness in the image to an actual thickness using a scale factor converting pixels to distance. In other embodiments, different techniques may be used to convert the pixels in region 160b to a wall thickness to generate wall loss information.

In 950, bottom wall loss information may be generated based on the image. As will be described in further detail below with respect to FIGS. 10-20, the region 160a of the image 160 may be used to generate the bottom wall loss information. In particular, the wall loss information that is generated may include quantitative wall loss information. In 960, in some embodiments, top wall loss information may be generated based on the image 160. Similar to the bottom wall loss information, the top wall loss information may be generated using the region 160a.

Figure 13:
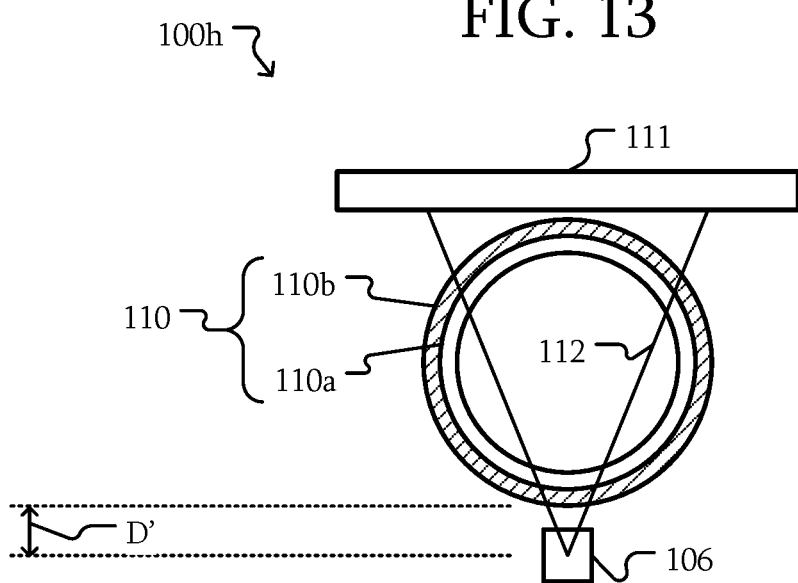
FIG. 13 is a block diagram of a radiographic inspection system with a radiation source in a different location according to some embodiments.

In some embodiments, the top and bottom wall loss information may be combined together as a result of the position of the radiation source 106. Referring to FIG. 2, for example, when the radiation source 106 is placed further away from the pipe 110, radiation in region 112a incident on the imaging array 111 may include contributions from both the bottom wall (the wall closest to the imaging array 111) and the top wall (the wall closest to the radiation source 106). That is, the data in the image in region 160a may be based on both the top wall and the bottom wall. In other embodiments, the radiation source 106 may be disposed in a different position. If the radiation source 106 is placed on or adjacent to the insulated pipe 110, such as illustrated in FIG. 13, data from the entire bottom wall may contribute to the region 160a of the image. However, only data from a smaller portion of the top wall may contribute to the region 160a of the image and may be spread across the region 160a.

In some embodiments, wall loss information may be generated for an entire circumference of the structure based on the image. That is, the combination of the bottom wall loss, the top wall loss, and the side wall loss may be obtained from a single image.

The control logic 109 may be configured to control the operation of the detector 102, radiation source 106, or the like to perform operations such as 910, 920, 950, and/or 960. However, in some embodiments, the control logic 109 may be configured to perform less than all of the operations. For example, the control logic 109 may be configured to operate the detector 102 and radiation source 106 to generate an image. The control logic 109 may be configured to transmit the image such as transmitting the image to a remote computer 125 as described above. The remote computer 125 or other system may be configured to perform the operations described in 920, 950, 960, or the like.

In some embodiments, positioning the radiation source in 900 may include positioning the radiation source from the structure further than two times a diameter of the structure. This position of the radiation source 106 may result in a collimated radiation 112 illuminating the entire width of the structure.

Referring to FIGS. 1 and 9B, in some embodiments, the operation includes moving the detector and radiation source along the structure to a second section of the structure in 970. The operations in 900, 910, 920, 950, or other operations described herein may be performed again on the second section of the structure. As a result, a different portion of the structure may be imaged and inspected. By repeating this operation, an entire length of a structure may be imaged and inspected. In some embodiments, moving the detector 102 and radiation source 106 may include rotating the detector 102 and the radiation source 106 around the structure.

Figure 10:
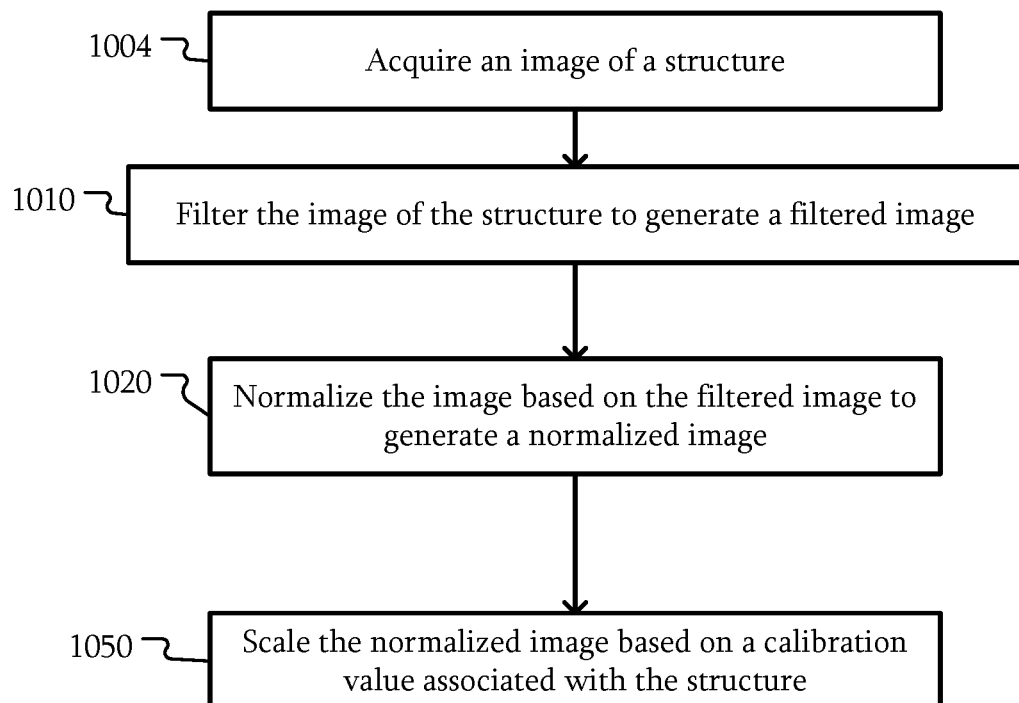
FIG. 10 is a flowchart illustrating a technique estimating material loss with a radiographic inspection system according to some embodiments.
Figure 11A:
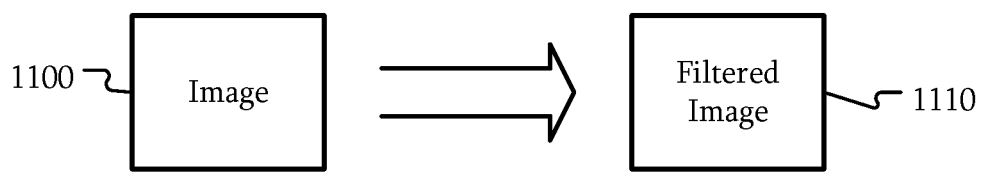
FIGS. 11A-11B are block diagrams illustrating techniques of estimating material loss according to some embodiments.
Figure 11B:
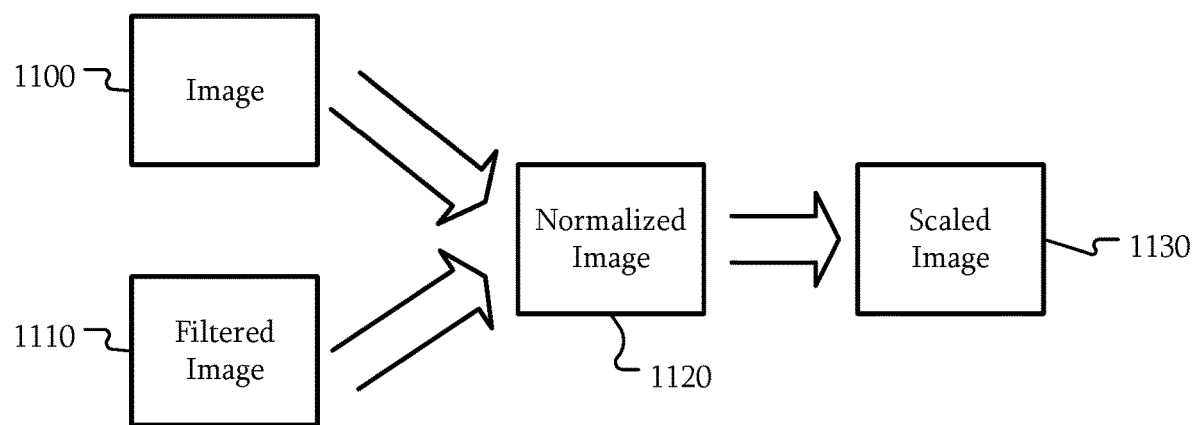

FIG. 10 is a flowchart illustrating a technique estimating material loss with a radiographic inspection system according to some embodiments. FIGS. 11A-11B are block diagrams illustrating techniques of estimating material loss according to some embodiments. Referring to FIGS. 1-3, 10, 11A, and 11B, the system 100 and the insulated pipe 110 will be used as an example; however, in other embodiments, different systems may be used. In particular, a system 100 that does not image an entire width of the insulated pipe 110 may be used, including a system 100 where the radiation source 106 is disposed adjacent to the insulated pipe 110.

In some embodiments, an image 1100 of an insulated pipe 110 is acquired in 1004. The image 1100 may be similar to the image 160 described above; however, in other embodiments, the image 1100 may include only portions of the region 160a due to a particular configuration of the detector 102, radiation source 106, and insulated pipe 110. In some embodiments, acquiring the image of the structure comprises generating radiation directed towards a structure and detecting the radiation after passing through the structure. The radiation source 106 may generate the radiation 112 towards the insulated pipe 110 and the detector 102. The detector 102 may generate an image 160 as describe above.

In 1010, the image 1100 of the pipe is filtered to generate a filtered image 1110. The filtering of the image may include a variety of filtering. For example, the filtering may include, non-linear digital filtering, median filtering, average filtering, mode filtering, spatial low-pass filtering, spatial smoothing or the like. The filtering may be any type of filtering that reduces a variation among the pixels across the image 1100 in the filtered image 1110. In some embodiments, the use of the filtering may reduce variations in the image 1100 to approach an overall grey level distribution of the image 1100. For example, the filtering may wash out or smooth out defects in the image 1100 to obtain an approximation of the background, i.e., the portions of the image without defects.

In some embodiments, the filtering may use a kernel size with a radius of about 100 pixels. The shape of the kernel may be square, circular, elliptical, symmetrical, aligned to major image features such as an axis of the pipe 110, vary across the image, or the like. In some embodiments, a size of the kernel may be based on an expected size of a defect. In particular, a size of the kernel may be larger than an expected largest defect. In some embodiments, the size of the kernel may be based on the pipe, such as a size of the pipe, a thickness of the wall of the pipe, or the like. In image processing, a kernel, convolution matrix, or mask is a small matrix used for blurring, sharpening, embossing, edge detection, and other filtering. Filtering is performed by doing a convolution between a kernel and an image. The kernel size is the size of the matrix.

In 1020, the image 1100 is normalized using the filtered image to generate a normalized image 1120. For example, the image 1100 may be divided by the filtered image 1110. The filtered image 1110 may be subtracted from the result of division to generate a normalized image 1120.

In 1050, the normalized image is scaled based on a transfer function associated with the insulated pipe 110. This transfer function represents a conversion between a normalized gray level (or normalized contrast) in the normalized image 1120 and a wall thickness such as a gray level per unit length. The normalized image 1120 may be divided by the transfer function to convert the gray levels of the normalized image 1120 into lengths in the scaled image 1130. In some embodiments, the process described herein may result in each pixel of the scaled image 1130 representing a wall thickness. As described below with respect to FIG. 14, the transfer function may be generated using measurements on samples with known thicknesses under a variety of conditions. The transfer function may be selected based on the particular insulated pipe 110. As a result, the transfer function may be applied to the gray levels in the normalized image 1120 to convert the gray levels to wall thickness.

The resulting scaled image 1130 is a quantitative result representing actual wall thickness. That is, the scaled image 1130 is more than a qualitative result only indicating a difference in thickness relative to another portion of the insulated pipe 110 in the image without a magnitude of the difference or the actual thickness.

Figure 12A:
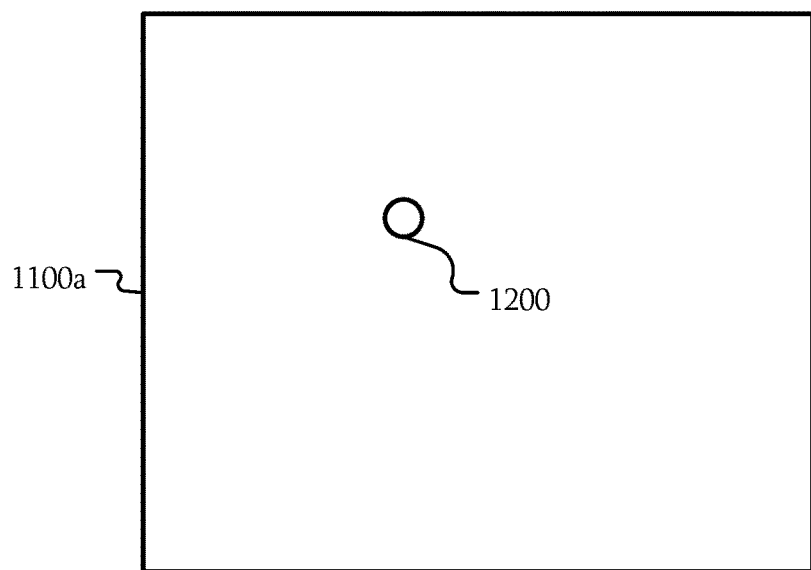
FIGS. 12A-12D are block diagrams illustrating images from techniques of estimating material loss according to some embodiments.
Figure 12B:
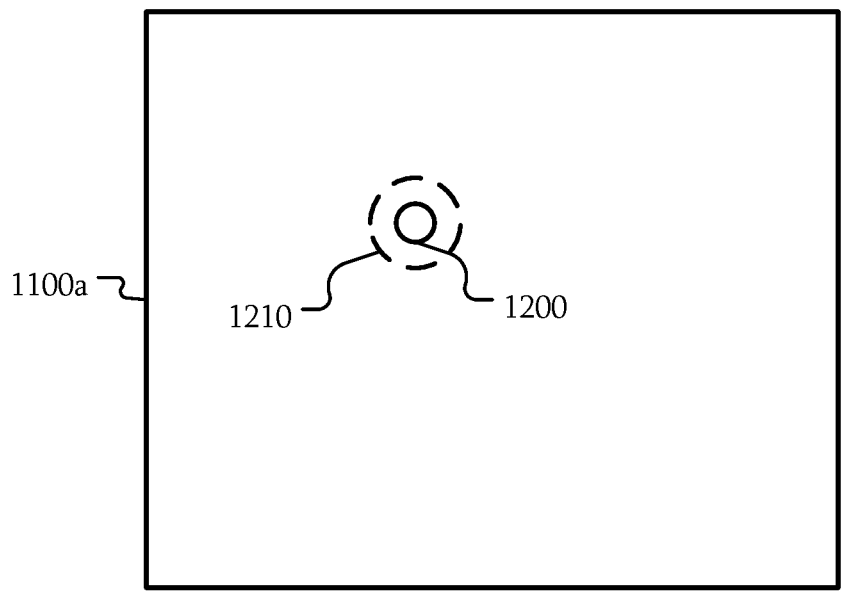

FIGS. 12A-12D are block diagrams illustrating images from techniques of estimating material loss according to some embodiments. Referring to FIG. 12A, image 1100a is an example of an image 1100 of FIGS. 11A-11B. Here a defect 1200 is present in the image 1100a. Referring to FIG. 12B, a kernel 1210 for a filter such as a non-linear digital filter (e.g., median filter) is selected. The size of the kernel 1210 is greater than that of the defect. In some embodiments, the selection of the kernel size may be made based on defects and/or variations in the actual image 1100a. In other embodiments, the selection may be made based on an expected size of a defect.

Figure 12C:
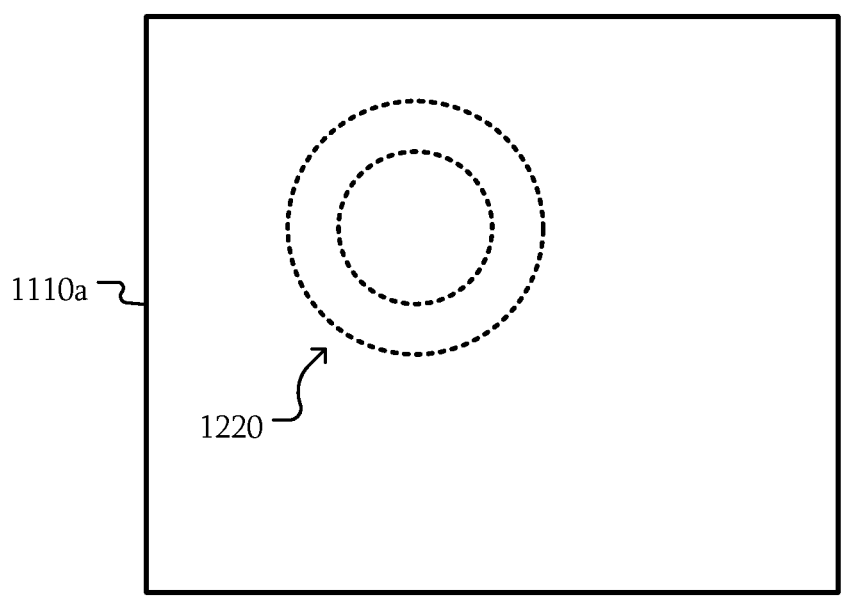

Referring to FIG. 12C, the filtered image 1110a is an example of the image 1100a filtered with the kernel 1210. As a result, the effect 1220 of the defect 1200 in the image is spread out in the filtered image 1110a. This filtered image 1110a may be used to normalize the image 1100a as described above.

In some embodiments, the operations described herein may remove the effect of integration time, isotope source, and/or other factors. Such factors may be removed due to the normalization. For example, normalization can correct for the Curie strength of the isotope source or radiation source not being constant. Regions without defects may result in a relative value of 1 in the normalized image 1120. That is, the normalized image 1120 may be at least somewhat independent of the absolute values in the image 1100.

Figure 12D:
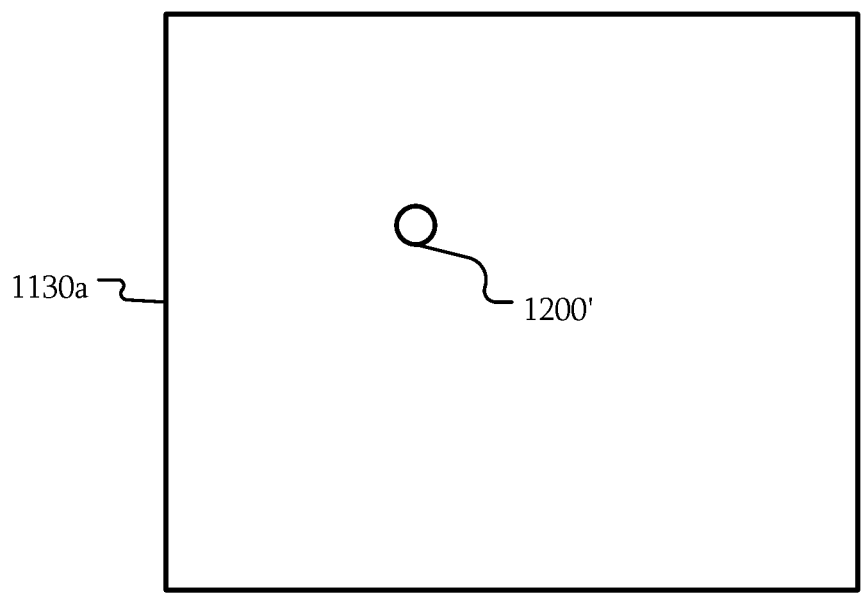

Referring to FIG. 12D, the scaled image 1130a is an example of the image 1100a normalized with the filtered image 1110a and scaled with a transfer function. The defect 1200 in the image 1100a is converted into a defect thickness 1200' where each pixel represents the actual wall thickness.

FIG. 13 is a block diagram of a radiographic inspection system with a radiation source in a different location according to some embodiments. In some embodiments, the material loss estimation techniques may be applied to images generated in ways different from that of the system 100 of FIG. 1. For example, as illustrated in FIG. 13, in the system 100h, the radiation source 106 may be placed closer to the insulated pipe 110. For example, the distance D' between the radiation source 106 and the insulated pipe 110 may be reduced to be as closer to the insulated pipe 110 than twice the diameter of the insulated pipe 110. In some embodiments, the radiation source 106 may be placed on the insulated pipe 110. An image generated by the system 100h may have a reduced impact by the wall closer to the radiation source 106. That is, the wall closer to the radiation source 106 may not contribute to the image or contribute a substantially uniform amount across the image, the material loss estimation may not include the contribution of that wall. In some embodiments, the system 100h may be rotated similar to the system 100 illustrated in FIGS. 4A and 4B.

In some embodiments, the radiation source 106 may be used in a manner illustrated in the system 100 of FIG. 1, i.e., beginning with the radiation source 106 further than about twice the diameter of the insulated pipe 110 from the insulated pipe 110. However, the radiation source 106 may be moved closer after finding a defect to further investigate the defect. The radiation source support arm 108 may be configured to controllably move the radiation source 106 in response to the control logic 109 from a position as illustrated in FIG. 1 to a position as illustrated in FIG. 13 and back again to the position as illustrated in FIG. 1.

Figure 14:
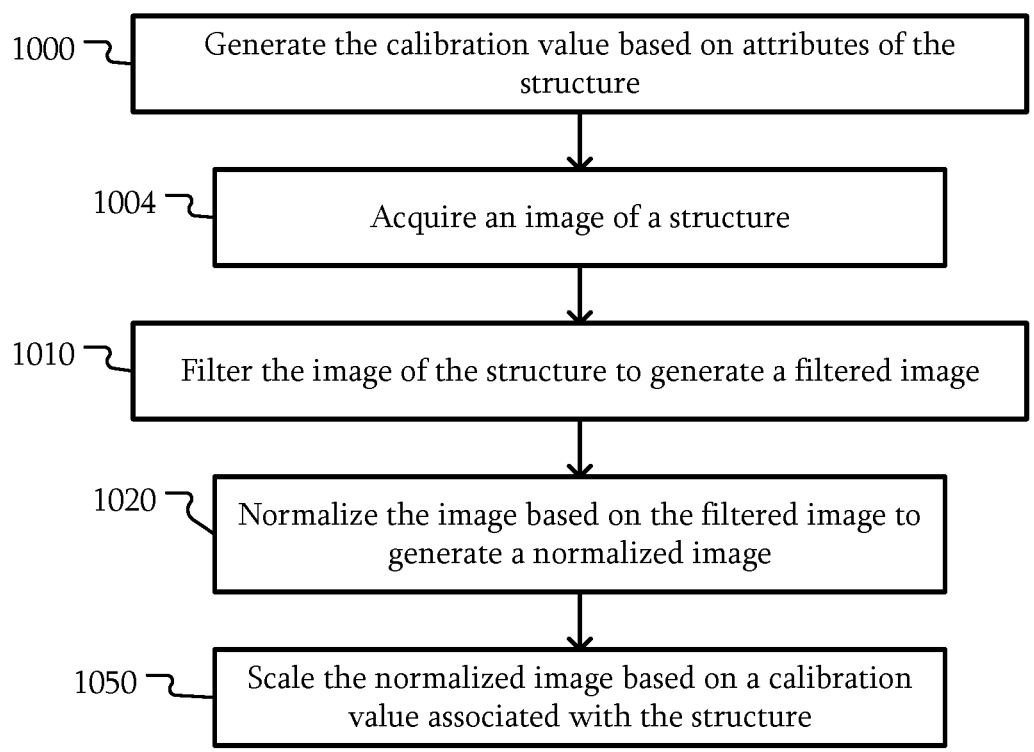
FIGS. 14-20 are flowcharts illustrating techniques of estimating material loss according to some embodiments.

FIGS. 14-20 are flowcharts illustrating techniques of estimating material loss according to some embodiments. The operations may be performed similar to those described above. Referring to FIG. 14, in 1000, the transfer function is generated based attributes of the pipe. The transfer function may be generated by a variety of techniques and have a variety of inputs. In some embodiments, multiple transfer functions may be generated experimentally for a variety of different pipe types, diameters, wall thicknesses, material within the pipe, radiation source 106, detector attributes 102, or the like. The results of the experiments from samples may be used to generate a transfer function with inputs associated with pipe attributes (e.g., pipe types, diameters, wall thicknesses, wall materials, insulation thickness, and insulation materials), material within the pipe attributes (e.g., air, water, multiphase, or other fluid or gas), radiation source attributes (e.g., isotope source or x-ray tube), and/or detector attributes (e.g., standard imaging or pixel binning). Pixel binning is a process of combining charge from adjacent pixels in an image sensor during readout resulting in a larger effective pixel size. Pixel binning (e.g., 2×2 and 4×4 pixel binning) can result in better contrast (or gray levels) and faster imaging. The values associated with different attributes, such as pipe attributes, material within the pipe attributes, radiation source attributes, or detector attributes, can be different inputs in the transfer function. In some embodiments, the different inputs for the transfer function based on the samples can be stored in a lookup table as constants that can be used to convert normalized contrast to material loss estimates for various attributes and/or pipe configurations. The contrast or gray levels of the image can change with changes in different attributes.

In some embodiments, a pipe may have a known thickness and a series of holes or defects, each with a known and different wall loss. For example, the pipe may have holes with 10%, 20%, 30%, 40% and 50% wall loss. The pipe with the holes may be imaged and normalized as described above. The normalized image values may be associated with the wall thickness in areas with 0% to 50% wall loss. A curve may be fit to the normalized image value and thickness tuples. The relationship between the normalized image value may be linear. In addition, the normalized image value at 0% loss should be zero. As a result, the curve may be defined by its slope alone. This process may be repeated for various attributes and/or pipe configurations resulting in the association of a slope of the normalized image value to thickness versus the various attributes and/or pipe configurations. For example, the slopes may be determined for a variety of different pipe diameters and materials within the pipe. These data may be used to generate a transfer function with the normalized image value and the matching attributes and pipe configuration in the field as input and the thickness as an output.

In some embodiments, the variety of different attributes and/or pipe configurations may be converted into an iron (Fe) equivalence (or someone other pipe material equivalence). A curve may be fit to the slope and Fe equivalence tuples to generate a transfer function. A pipe in the field may have an Fe equivalence. The Fe equivalence may be used as an input to obtain the slope to convert the normalized image values into thicknesses as described above.

In some embodiments, a transfer function may be fit to the n-tuples of slope and various attributes and/or pipe configurations. Accordingly, the transfer function may include the normalized image value and the matching attributes and pipe configuration in the field as input and the thickness as an output.

In some embodiments, two measurements may be made of the samples with known thicknesses and defects. One image may be acquired with the known defect on a bottom wall and another image may be acquired with the known defect on the top wall. Although imaging the same known defect, the resulting normalized image value for the defect may be different. When used in the field, the resulting two transfer functions may be used to determine if the wall loss is on the top wall or the bottom wall.

Figure 15:
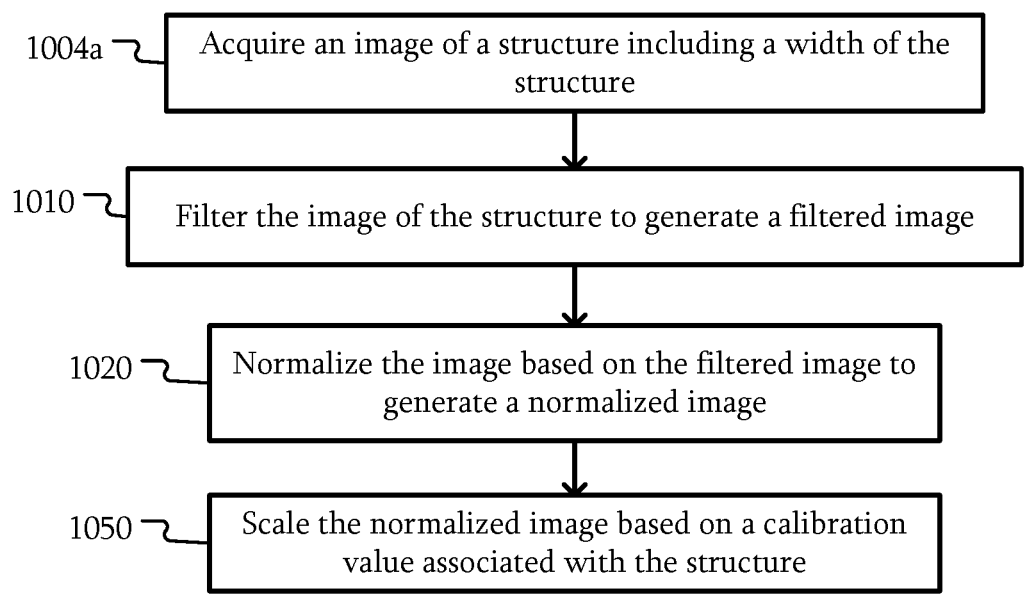

Referring to FIG. 15, in 1004*a*, acquiring the image of the structure comprises acquiring the image of the structure including a width of the structure. As described above, an image 160 may be acquired of a structure such as a pipe 110. The operations described herein may be performed on the entire image, the region 160*a*, a smaller region within the region 160*a*, or the like. In some embodiments, techniques described in FIGS. 14 and 15 can be combined where the width of the structure from the image can be used to determine an input to a transfer function to use in the material loss estimation.

Figure 16:
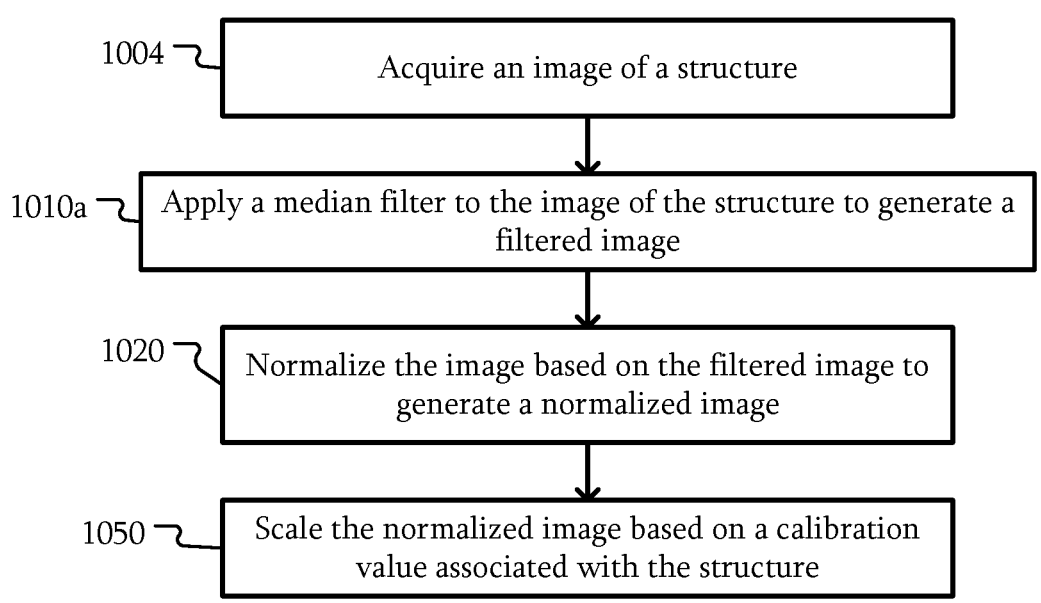
Figure 17:
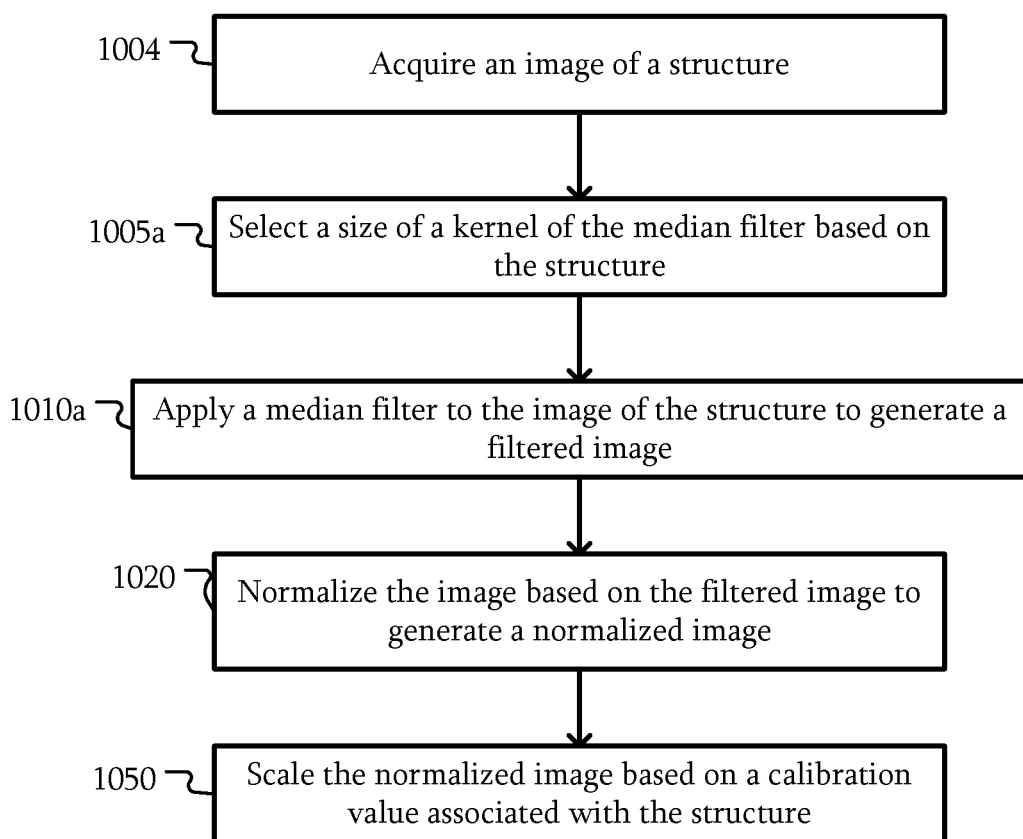
Figure 18:
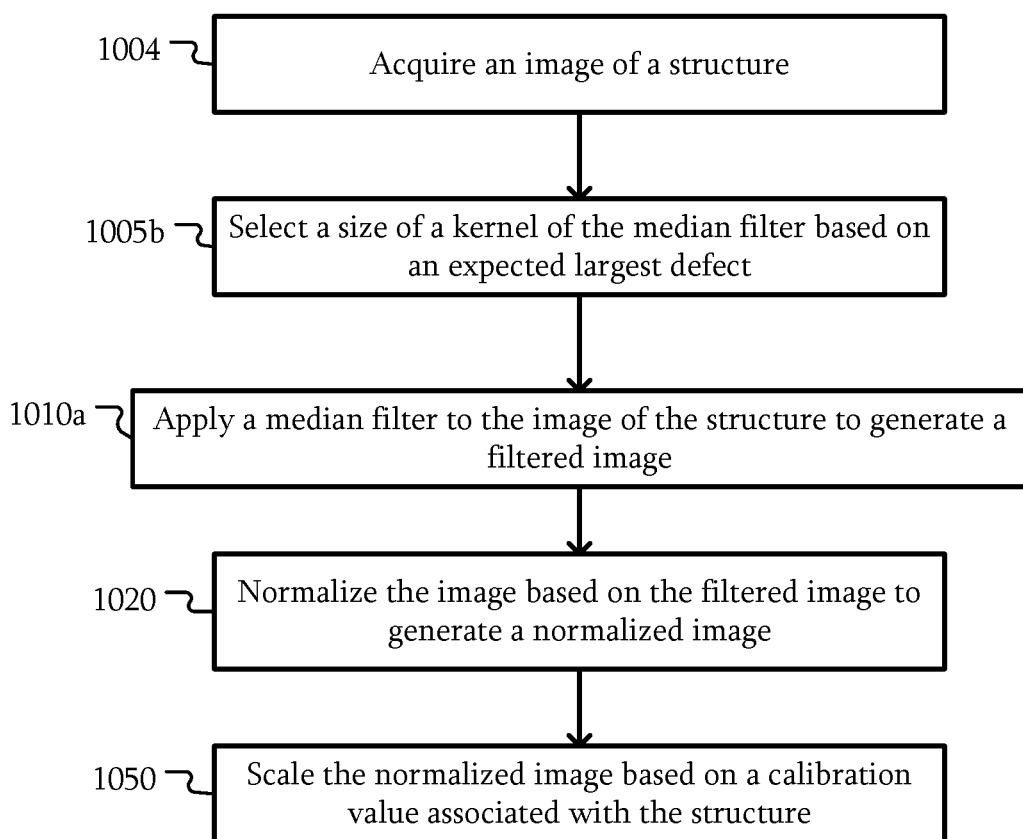
Figure 19:
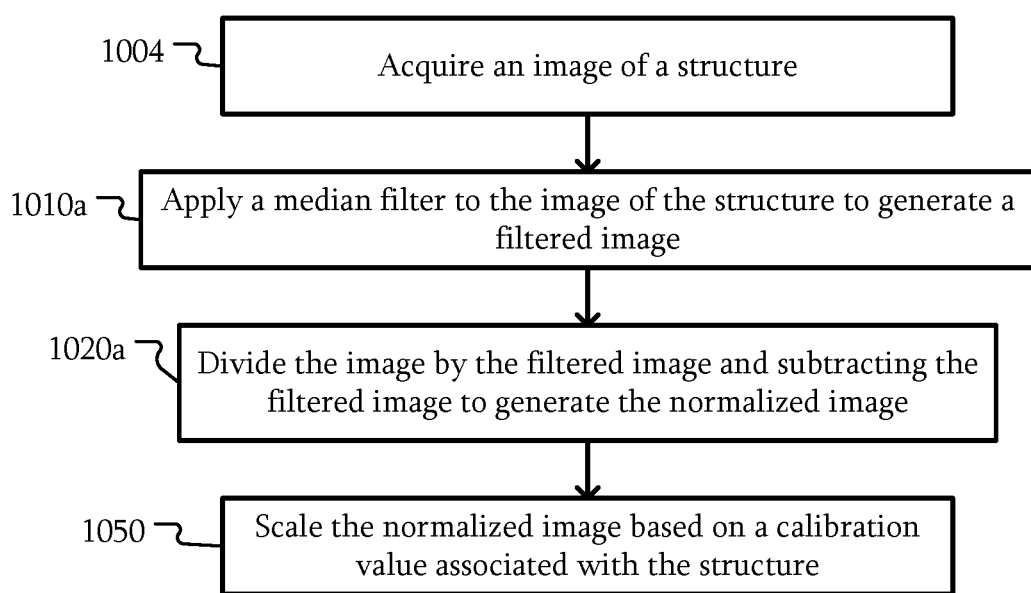

Referring to FIG. 16, in 1010*a*, a non-linear digital filter is applied to the image of the structure to generate the filtered image. Referring to FIG. 17, in 1005*a*, a size of a kernel of the non-linear digital filter is selected based on the structure. Referring to FIG. 18, in 1005*b*, a size of a kernel of the non-linear digital filter is selected based on an expected largest defect. Referring to FIG. 19, in 1020*a*, normalizing the image based on the filtered image comprises dividing the image by the filtered image and subtracting the filtered image to generate the normalized image.

Figure 20:
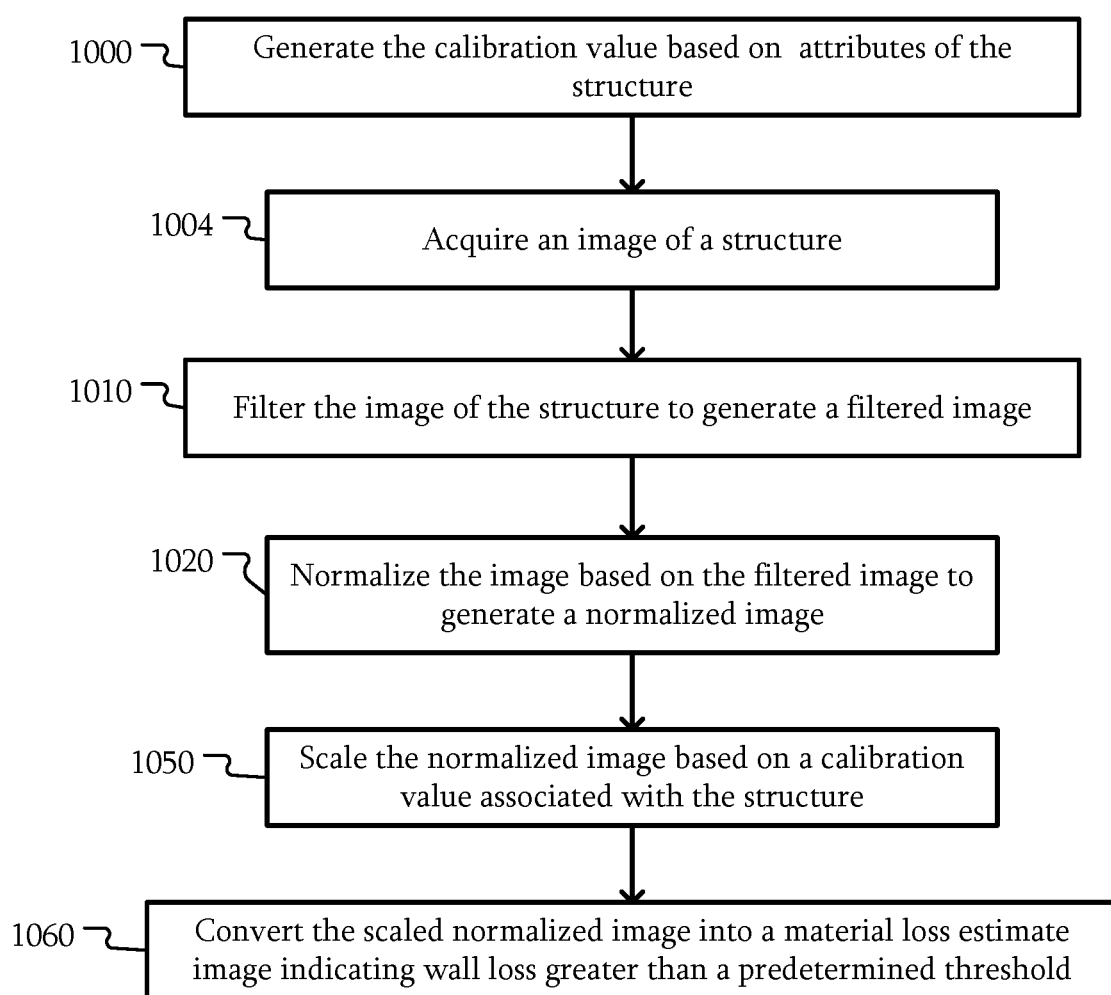

Referring to FIG. 20, in 1060, the scaled normalized image is converted into a material loss estimate image indicating wall loss greater than a predetermined threshold. For example, the scaled image may be converted to emphasize the material loss. In some embodiments, the material loss may be further converted into a percentage of material loss. Percentage ranges may be converted into colors of a colored image. In a particular example, a material loss percentage in the range from 0% to 20% may be colored black. A manufacturing tolerance of a structure may be about 20%. Accordingly, the material loss results less than a predetermined percentage, such as 20% may be considered within a normal tolerance. A range of 20% to 30% may be colored green. A range of 30% to 40% may be colored blue. A range of 40% to 50% may be colored yellow. A range greater than 50% may be colored red. Accordingly, wall lost may be converted to a color that may be more recognizable to a user. Colors other than black or black and green may indicate areas where further inspection of the structure is performed. For example, further inspection may be performed using the same system 100, the system 100 configured in a different manner, another similar system, another type of system such as an ultrasonic inspection system, or the like.

Figure 21A:
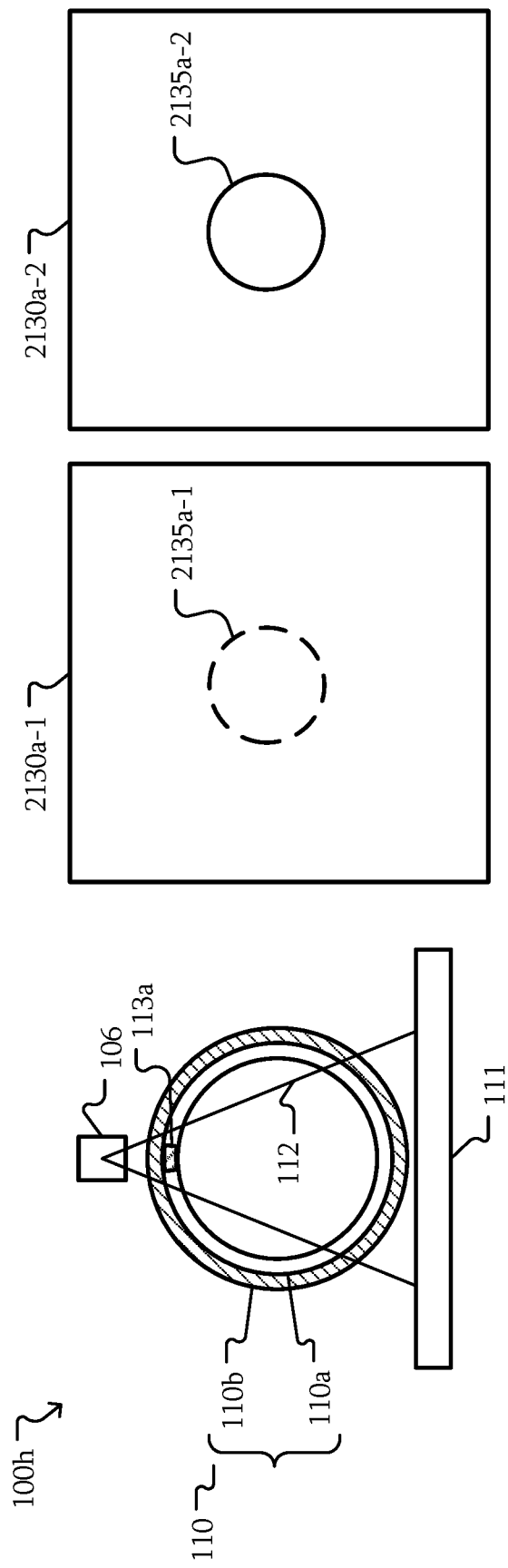

FIGS. 21A-21D are block diagrams illustrating a radiographic inspection system, an insulated pipe with various defects, and corresponding images according to some embodiments. Referring to FIG. 21A, the system 100*h* of FIG. 13 will be used as an example; however, in other embodiments, the operations may be used with different systems 100 described above. In this example, the pipe 110*a* includes a defect 113*a* on the top wall (furthest from the imaging array 111).

In some embodiments, a transfer function may be generated as described above based on defects in a top wall and another transfer function may be generated as described above based on defects in a bottom wall. For example, an insulated pipe 110 with calibrated defects in the bottom wall (closest to the imaging array 111) may be analyzed as described above to generate a bottom wall transfer function. Similarly, an insulated pipe 110 with calibrated defects in the top wall (closest to the imaging array 111) may be analyzed as described above to generate a top wall transfer function. The top wall transfer function may scale an image more than a bottom wall transfer function as the contrast generated by the calibrated defects in the top wall will be less than when the same defect is present in the bottom wall.

Image 2130a-1 was generated using the bottom wall transfer function while image 2130a-2 was generated using the top wall transfer function. The defect 113a on the top wall results in an artifact 2135a-1. The artifact 2135a-1 is illustrated with a dashed line to represent the reduced contrast due to the defect 113a being in the top wall.

The image 2130a-2 has artifact 2135a-2 corresponding to defect 113a. In contrast to image 2130a-1, the artifact 2135a-2 is illustrated with a solid line to represent the nominal contrast. That is, the top wall transfer function was generated using calibrated defects in the top wall, defect 113a in the top wall will result in an artifact 2135a-2 with a nominal contrast.

In some embodiments, the contrast of the artifact 2135a-1 may be too low to register as a defect. For example, if the contrast indicates a wall loss of less than about 20%, the wall loss may be categorized as no wall loss. In some embodiments, both top wall and bottom wall transfer functions may be used to generate images such as images 2130c-1 and 2130c-2. Both may be analyzed to determine if a defect is present. Accordingly, a likelihood of missing a defect in the top wall may be reduced.

Figure 21B:
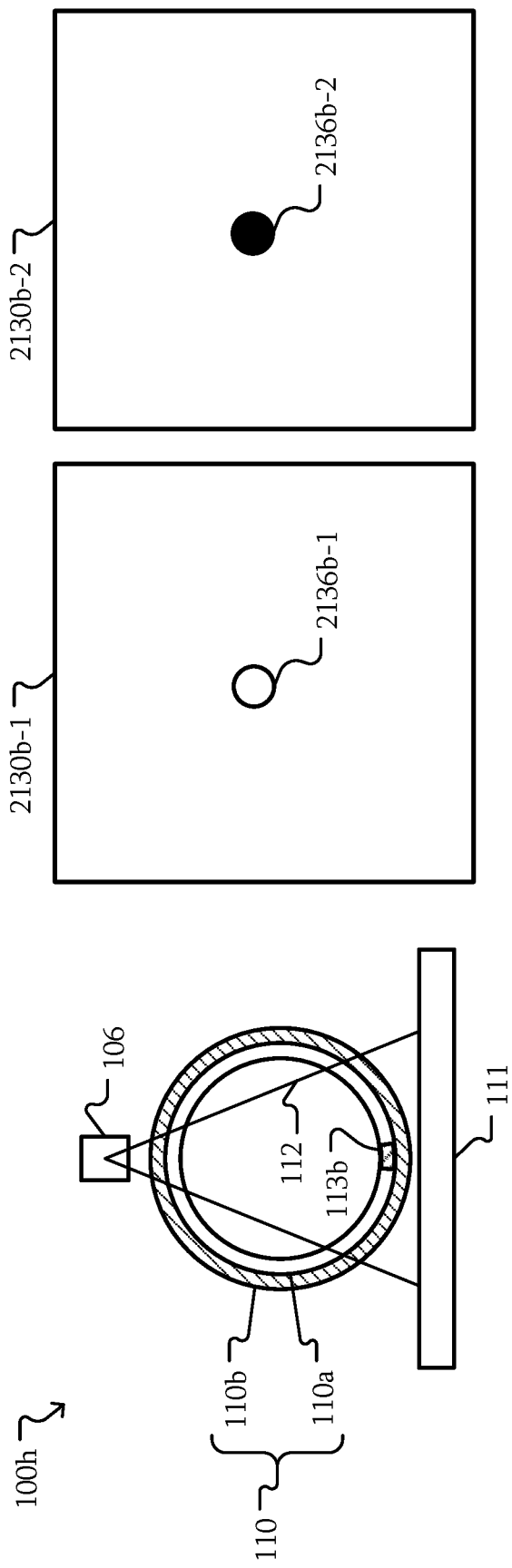

Referring to FIG. 21B, the system 100h of FIG. 13 will again be used as an example; however, in other embodiments, the operations may be used with different systems 100 described above. In this example, the pipe 110a includes a defect 113b on the bottom wall (closest to the imaging array 111).

Image 2130b-1 was generated using the bottom wall transfer function while image 2130b-2 was generated using the top wall transfer function. The defect 113b on the bottom wall results in an artifact 2136b-1. The artifact 2136b-1 is illustrated with a solid line to represent the nominal contrast due to the defect 113b being in the bottom wall. The contrast for the artifact 2136b-1 is nominal as the image 2130b-1 was generated using the bottom wall transfer function and the defect 113b resulting in the 2136b-1 is on the bottom wall.

The image 2130b-2 has artifact 2136b-2 corresponding to defect 113b. In contrast to image 2130b-1, the artifact 2136b-2 is illustrated with a higher contrast represented by the solid black shading. The top wall transfer function scales the image 2130b-2 more than the bottom wall transfer function. As a result, the contrast due to the defect 113b in the bottom wall will result in a relatively higher contrast.

Figure 21C:
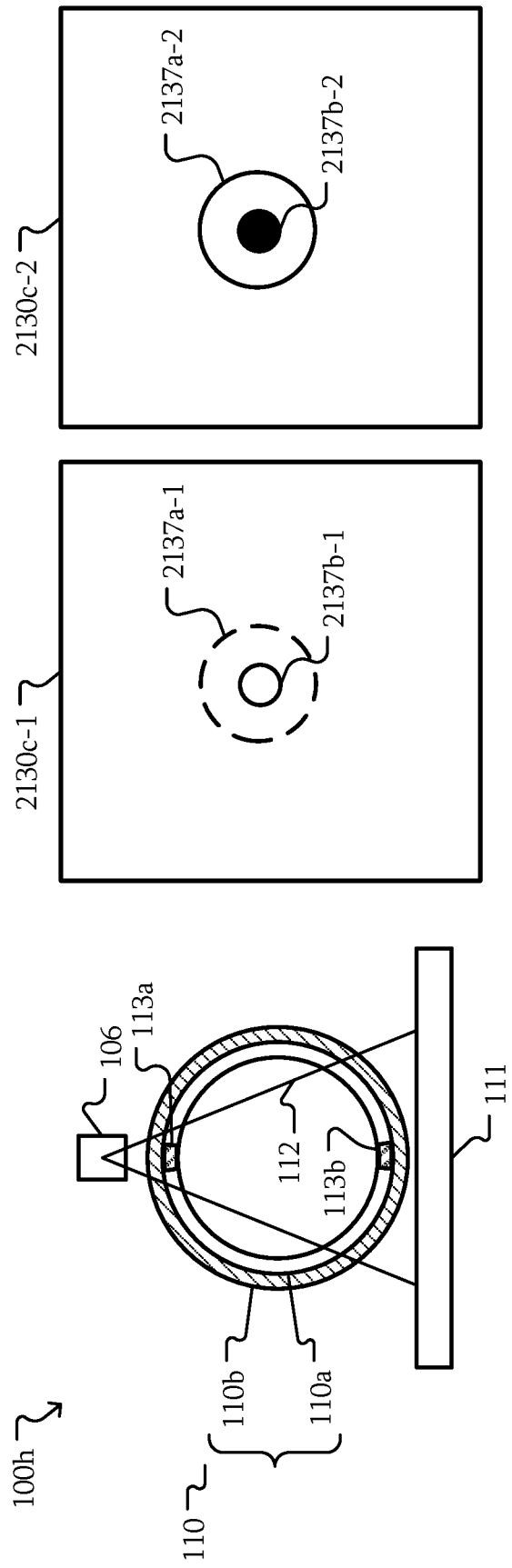

Referring to FIG. 21C, the system 100h of FIG. 13 will again be used as an example; however, in other embodiments, the operations may be used with different systems 100 described above. In this example, the pipe 110a includes a defect 113b on the bottom wall (closest to the imaging array 111) and a defect 113a on the top wall (furthest from the imaging array 111). As both defects 113a and 113b are in the path of the x-ray beam 112, both defects 113a and 113b will contribute to the resulting images 2130c-1 and 2130c-2. The defects 113a and 113b may result in the artifacts 2137a-1 and 2137b-1 in image 2130c-1 and the artifacts 2137a-2 and 2137b-2 in image 2130c-2 similar to the corresponding artifacts and images of FIGS. 21A and 21B. Even though the defects 113a and 113b result in superimposed artifacts in the images 2130c-1 and 2130c-2, may be analyzed as described above with respect to the individual defects 113a and 113b. As a result, substantially all of the defects in a wall may be identified regardless of position.

Referring to FIGS. 21A, 21B and 21D, the system 100h of FIG. 13 will again be used as an example; however, in other embodiments, the operations may be used with different systems 100 described above. In some embodiments, images 2130b-1 and 2130b-2 may be generated as illustrated in FIG. 21B. The system 100h may be rotated around the insulated pipe 110 to an opposite side of the insulated pipe 110. As a result, as illustrated in FIG. 21D, the defect 113b that was previously closer to the imaging array 111 may not be further from the imaging array 111. Images 2130d-1 and 2130d-2 were generated using the bottom wall and top wall transfer functions, respectively. The resulting artifacts 2138b-1 and 2138b-2 in images 2130d-1 and 2130d-2 may be similar to the artifacts 2135a-1 and 2135a-2 illustrated in FIG. 21A.

In particular, the same defect 113b resulted in two changes to the artifacts in images. Both the relative size of the artifact and the contrast of the artifact changed. In some embodiments, one or both of a change in the size and contrast of an artifact may be used to determine on which wall of the insulated pipe 110 the associated defect 113b is located. Accordingly, when analyzing that particular defect 113b, the quantitative wall loss may be estimated by selecting the transfer function corresponding to the wall on which the defect 113b is located.

Although one defect 113b is used as an example, in other embodiments, more defects may be analyzed in a single set of images. In addition, some artifacts in images may be scaled using a top wall transfer function while other artifacts may be scaled using a bottom wall transfer function. In some embodiments, an image may be selected such that the bottom wall transfer function may be used. For example, after determining that the defect 113b is on the bottom wall in the orientation of the system 100h of FIG. 21B, image 2130b-1 may be selected and scaled using the bottom wall transfer function to generate the quantitative wall loss. The image 2130d-2 of FIG. 21D may result in a reduced accuracy as a higher scaling factor from the top wall transfer function was used to generate the image 2130d-2.

While rotating 180 degrees may be used as an example of an amount of rotation of the system 100h, in other embodiments the rotation and the generation of two sets of images may be different. For example, the system 100h may be rotated around the insulated pipe 110 in 90 degree increments, generating four sets of images; in 60 degree increments, generating six sets of images; in 45 degree increments, generating eight sets of images; and in 30 degree increments, generating twelve sets of images; or the like.

As shown in FIGS. 21A, 21B, and 21C, the defects in a wall may be identified using a top wall transfer function with a bottom wall transfer function and/or comparing images generated using a top wall transfer function with a bottom wall transfer function. As shown in FIGS. FIGS. 21A, 21B and 21D, the defects in a wall may be identified using images taken at multiple rotational positions around a structure.

Some embodiments include a radiographic inspection system 100-100h, comprising a drive mechanism 104 configured to move along a structure 110; a detector 102 attached to the drive mechanism 104; a radiation source 106 attached to the drive mechanism 104 and positionable relative to the detector 102 such that a width of the structure 110 casts a radiation shadow on an active area of the detector 102; and control logic 109 coupled to the detector 102 and configured to receive an image from the detector 102; generate side wall loss information based on the image; and generate bottom wall loss information based on the image.

In some embodiments, the control logic 109 is further configured to generate top wall loss information based on the image.

In some embodiments, the drive mechanism 104 is configured to rotate the detector 102 and radiation source 106 at least partially around the structure 110.

In some embodiments, the control logic 109 is further configured to filter at least part of the image to generate a filtered image; normalize the at least part of the image based on the filtered image to generate a normalized image; and scale at least part of the normalized image based on a transfer function associated with the structure 110.

In some embodiments at least one of the detector 102 and the radiation source 106 are detachable from the drive mechanism 104.

In some embodiments, the system 100-100*h* further comprises a positioning system 115 100-100*h* configured to generate position information, wherein the control logic 109 is configured to associate at least one of the image, the side wall loss information, and the bottom wall loss information with the position information.

In some embodiments, the drive mechanism 104, and the detector 102 are configured to move along a side of the structure 110 opposite to structure 110 supports.

In some embodiments, the system 100-100*h* further comprises a power source 192 attached to the drive mechanism 104.

In some embodiments, the system 100-100*h* further comprises a communication interface 109, 117; wherein the control logic 109 is configured to communicate at least one of the image, the side wall loss data, and the bottom wall loss data through the communication interface 109, 117.

Some embodiments include a method of operating a radiographic inspection system 100-100*h*, comprising positioning a drive mechanism 104, detector 102, and radiation source 106 around a structure 110; generating an image of a section of the structure 110 using the detector 102 and radiation source 106 including at least a width of the structure 110; generating side wall loss information based on the image; and generating bottom wall loss information based on the image.

In some embodiments, positioning the radiation source 106 comprises positioning the radiation source 106 from the structure 110 further than two times a diameter of the structure 110.

In some embodiments, the method further comprises generating top wall loss information based on the image.

In some embodiments, the method further comprises generating wall loss information for an entire circumference of the structure 110 based on the image.

In some embodiments, generating the image of the section of the structure 110 comprises generating an image of the section of the structure 110 and a calibrated object adjacent to the structure 110; and generating the side wall loss information based on the image comprises generating the side wall loss information based on a portion of the image based on the calibrated object adjacent to the structure 110.

In some embodiments, the method further comprises moving the detector 102 and radiation source 106 along the structure 110 to a second section of the structure 110; generating an image of the second section of the structure 110 using the detector 102 and radiation source 106 including at least a width of the structure 110 in the second section; generating side wall loss information based on the image of the second section; and generating bottom wall loss information based on the image of the second section.

In some embodiments, the method further comprises rotating the detector 102 and the radiation source 106 around the structure 110.

In some embodiments, the method further comprises filtering at least part of the image of the structure 110 to generate a filtered image; normalizing the at least part of the image based on the filtered image to generate a normalized image; scaling at least part of the normalized image based on a transfer function associated with the structure 110.

In some embodiments, the method further comprises adjusting a position of the radiation source 106.

Some embodiments include a radiographic inspection system 100-100*h*, comprising means for generating radiation; means for generating an image based on the radiation coupled to the means for generating radiation; means for moving the means for generating radiation and means for generating the image based on the radiation; and means for generating side wall loss information and bottom wall loss information based on the image.

Examples of the means for generating radiation include the radiation source 106. Examples of the means for generating an image based on the radiation coupled to the means for generating radiation include the detector 102 and imaging array 111. Examples of the means for moving the means for generating radiation and means for generating the image based on the radiation include the drive mechanism 104 and radiation source support arm 108. Examples of the means for generating side wall loss information and bottom wall loss information based on the image include the control logic 109 and the computer 125.

In some embodiments, the means for generating side wall loss information and bottom wall loss information based on the image further comprise means for generating top wall loss information based on the image. Examples of the means for generating top wall loss information based on the image include the control logic 109 and the computer 125.

Some embodiments include a method, comprising acquiring an image of a structure 110; filtering the image of the structure 110 to generate a filtered image; normalizing the image based on the filtered image to generate a normalized image; and scaling the normalized image based on a transfer function associated with the structure 110.

In some embodiments, the method further comprises generating the transfer function based on attributes of the structure 110.

In some embodiments, generating the transfer function comprises acquiring normalized images of known defects in structure 110*s* with at least one different attribute; and generating the transfer function based on the normalized images; wherein scaling the normalized image based on the transfer function associated with the structure 110 comprises providing the at least one attribute of the structure 110 as an input to the transfer function.

In some embodiments, scaling the normalized image based on the transfer function associated with the structure 110 comprises scaling the normalized image based on a top wall transfer function; and scaling the normalized image based on a bottom wall transfer function.

In some embodiments, acquiring the image of the structure 110 comprises generating radiation directed towards a structure 110; and detecting the radiation after passing through the structure 110.

In some embodiments, acquiring the image of the structure 110 comprises acquiring the image of the structure 110 including a width of the structure 110.

In some embodiments, filtering the image of the structure 110 to generate the filtered image comprises applying a non-linear digital filter to the image of the structure 110.

In some embodiments, the method further comprises selecting a size of a kernel of the non-linear digital filter based on the structure 110.

In some embodiments, the method further comprises selecting a size of a kernel of the non-linear digital filter based on an expected largest defect.

In some embodiments, normalizing the image based on the filtered image comprises dividing the image by the filtered image and subtracting the filtered image to generate the normalized image.

In some embodiments, the method further comprises converting the scaled normalized image into a material loss estimate image indicating wall loss greater than a predetermined threshold.

In some embodiments, filtering the image of the structure 110 to generate a filtered image comprises filtering a subset of the image; and normalizing the image based on the filtered image to generate a normalized image comprises normalizing the subset of the image based on the filtered image to generate the normalized image.

Some embodiments include a system 100-100h, comprising a radiation source 106; a detector 102 positionable to receive the radiation with a structure 110 disposed between the radiation source 106 and the detector 102; and control logic 109 configured to acquire an image of the structure 110 using the detector 102; filter the image of the structure 110 to generate a filtered image; normalize the image based on the filtered image to generate a normalized image; and scale the normalized image based on a transfer function associated with the structure 110.

In some embodiments, the control logic 109 is further configured to generate the transfer function based on attributes of the structure 110.

In some embodiments, the control logic 109 is further configured to acquire the image of the structure 110 including a width of the structure 110.

In some embodiments, the control logic 109 is further configured to apply a non-linear digital filter to the image of the structure 110.

In some embodiments, the control logic 109 is further configured to select a size of a kernel of the non-linear digital filter based on the structure 110.

In some embodiments, the control logic 109 is further configured to select a size of a kernel of the non-linear digital filter based on an expected largest defect.

In some embodiments, the control logic 109 is further configured to divide the image by the filtered image and subtract the filtered image to generate the normalized image.

In some embodiments, the control logic 109 is further configured to convert the scaled normalized image into a material loss estimate image indicating wall loss greater than a predetermined threshold.

Some embodiments include a system 100-100h, comprising means for acquiring an image of a structure 110; means for filtering the image of the structure 110 to generate a filtered image; means for normalizing the image based on the filtered image to generate a normalized image; and means for scaling the normalized image based on a transfer function associated with the structure 110.

Examples of the means for acquiring an image of a structure include the detector 102, imaging array 111, and radiation source 106. Examples of the means for filtering the image of the structure to generate a filtered image include the control logic 109 and the computer 125. Examples of the means for normalizing the image based on the filtered image to generate a normalized image include the control logic 109 and the computer 125. Examples of the means for scaling the normalized image based on a transfer function associated with the structure include the control logic 109 and the computer 125.

In some embodiments, the means for normalizing the image comprises means for dividing the image by the filtered image and subtracting the filtered image to generate the normalized image. Examples of the means for dividing the image by the filtered image and subtracting the filtered image to generate the normalized image include the control logic 109 and the computer 125.

Although the structures, devices, methods, and systems have been described in accordance with particular embodiments, one of ordinary skill in the art will readily recognize that many variations to the particular embodiments are possible, and any variations should therefore be considered to be within the spirit and scope disclosed herein. Accordingly, many modifications may be made by one of ordinary skill in the art without departing from the spirit and scope of the appended claims.

The claims following this written disclosure are hereby expressly incorporated into the present written disclosure, with each claim standing on its own as a separate embodiment. This disclosure includes all permutations of the independent claims with their dependent claims. Moreover, additional embodiments capable of derivation from the independent and dependent claims that follow are also expressly incorporated into the present written description. These additional embodiments are determined by replacing the dependency of a given dependent claim with the phrase "any of the claims beginning with claim [xx] and ending with the claim that immediately precedes this one," where the bracketed term "[x]" is replaced with the number of the most recently recited independent claim. For example, for the first claim set that begins with independent claim 1, claim 3 can depend from either of claims 1 and 2, with these separate dependencies yielding two distinct embodiments; claim 4 can depend from any one of claim 1, 2, or 3, with these separate dependencies yielding three distinct embodiments; claim 5 can depend from any one of claim 1, 2, 3, or 4, with these separate dependencies yielding four distinct embodiments; and so on.

Recitation in the claims of the term "first" with respect to a feature or element does not necessarily imply the existence of a second or additional such feature or element. Elements specifically recited in means-plus-function format, if any, are intended to be construed to cover the corresponding structure, material, or acts described herein and equivalents thereof in accordance with 35 U.S.C. § 112(f). Embodiments of the invention in which an exclusive property or privilege is claimed are defined as follows.

The invention claimed is:

1. A method, comprising:
   acquiring an image of a structure;
   filtering the image of the structure to generate a filtered image;
   normalizing the image based on the filtered image to generate a normalized image; and
   scaling the normalized image based on a transfer function associated with the structure.

2. The method of claim 1, further comprising generating the transfer function based on attributes of the structure.

3. The method of claim 2, wherein generating the transfer function comprises:
　acquiring normalized images of known defects in structures with at least one different attribute; and
　generating the transfer function based on the normalized images;
　wherein scaling the normalized image based on the transfer function associated with the structure comprises providing the at least one attribute of the structure as an input to the transfer function.

4. The method of claim 1, wherein scaling the normalized image based on the transfer function associated with the structure comprises:
　scaling the normalized image based on a top wall transfer function; and
　scaling the normalized image based on a bottom wall transfer function.

5. The method of claim 1, wherein acquiring the image of the structure comprises:
　acquiring the image of the structure including a width of the structure.

6. The method of claim 1, wherein filtering the image of the structure to generate the filtered image comprises applying a non-linear digital filter to the image of the structure.

7. The method of claim 6, further comprising selecting a size of a kernel of the non-linear digital filter based on the structure.

8. The method of claim 6, further comprising selecting a size of a kernel of the non-linear digital filter based on an expected largest defect.

9. The method of claim 6, wherein normalizing the image based on the filtered image comprises dividing the image by the filtered image and subtracting the filtered image to generate the normalized image.

10. The method of claim 1, further comprising converting the scaled normalized image into a material loss estimate image indicating wall loss greater than a predetermined threshold.

11. The method of claim 1, wherein:
　filtering the image of the structure to generate a filtered image comprises filtering a subset of the image; and
　normalizing the image based on the filtered image to generate a normalized image comprises normalizing the subset of the image based on the filtered image to generate the normalized image.

12. A system, comprising:
　a radiation source;
　a detector positionable to receive the radiation with a structure disposed between the radiation source and the detector; and
　control logic configured to:
　　acquire an image of the structure using the detector;
　　filter the image of the structure to generate a filtered image;
　　normalize the image based on the filtered image to generate a normalized image; and
　　scale the normalized image based on a transfer function associated with the structure.

13. The system of claim 12, wherein the control logic is further configured to generate the transfer function based on attributes of the structure.

14. The system of claim 12, wherein the control logic is further configured to:
　acquire the image of the structure including a width of the structure.

15. The system of claim 12, wherein the control logic is further configured to apply a non-linear digital filter to the image of the structure.

16. The system of claim 15, wherein the control logic is further configured to select a size of a kernel of the non-linear digital filter based on at least one of the structure and an expected largest defect.

17. The system of claim 15, wherein the control logic is further configured to divide the image by the filtered image and subtract the filtered image to generate the normalized image.

18. The system of claim 12, wherein the control logic is further configured to convert the scaled normalized image into a material loss estimate image indicating wall loss greater than a predetermined threshold.

19. A system, comprising:
　means for acquiring an image of a structure;
　means for filtering the image of the structure to generate a filtered image;
　means for normalizing the image based on the filtered image to generate a normalized image; and
　means for scaling the normalized image based on a transfer function associated with the structure.

20. The system of 19, wherein the means for normalizing the image comprises means for dividing the image by the filtered image and subtracting the filtered image to generate the normalized image.

* * * * *